United States Patent [19]

Igari et al.

[11] Patent Number: 5,666,238
[45] Date of Patent: Sep. 9, 1997

[54] DATA SECTOR CONTROL APPARATUS AND METHOD FOR DISK STORAGE SYSTEM

[75] Inventors: Fubito Igari; Toru Takemura; Satoshi Shibata; Akio Mizuno, all of Tokyo, Japan

[73] Assignee: Kabushiki Kaisha Toshiba, Kawasaki, Japan

[21] Appl. No.: 617,433

[22] Filed: Mar. 18, 1996

Related U.S. Application Data

[62] Division of Ser. No. 363,705, Dec. 23, 1994, abandoned.

[30] Foreign Application Priority Data

| Dec. 28, 1993 | [JP] | Japan | 5-350192 |
| Jul. 15, 1994 | [JP] | Japan | 6-164070 |
| Aug. 24, 1994 | [JP] | Japan | 6-199706 |

[51] Int. Cl.⁶ .............................. G11B 5/596; G11B 5/09
[52] U.S. Cl. ...................... 360/77.08; 360/51; 360/78.14
[58] Field of Search ........................ 360/78.14, 77.02, 360/77.08, 51, 78.04

[56] References Cited

U.S. PATENT DOCUMENTS

| 4,390,912 | 6/1983 | Hetrich et al. | 360/78.14 |
| 4,488,189 | 12/1984 | Axmear et al. | 360/78.06 |
| 4,978,902 | 12/1990 | Hatagami et al. | 318/608 |
| 4,999,720 | 3/1991 | Wilson et al. | 360/48 |
| 5,036,408 | 7/1991 | Leis et al. | 360/48 |
| 5,050,013 | 9/1991 | Holsinger | 360/72.1 |
| 5,255,136 | 10/1993 | Machado et al. | 360/77.08 |
| 5,276,564 | 1/1994 | Hessing et al. | 360/51 |
| 5,459,623 | 10/1995 | Blagaila et al. | 360/77.08 |

FOREIGN PATENT DOCUMENTS

WO 92/05543  4/1992  WIPO.

*Primary Examiner*—Aristotelis Psitos
*Assistant Examiner*—Regina Y. Neal
*Attorney, Agent, or Firm*—Limbach & Limbach L.L.P.

[57] ABSTRACT

Servo sector numbers for identifying servo areas are recorded at predetermined positions in the respective servo areas on a disk. A plurality of data sectors are arranged between the respective servo areas. When a data sector is to be accessed, a servo circuit extracts a corresponding servo sector number. A CPU generates a data sector pulse at a timing corresponding to the start position of the data sector on the basis of the extracted servo sector number. The start position of the data sector is accurately detected in accordance with this data sector pulse, thereby reliably performing data access.

6 Claims, 20 Drawing Sheets

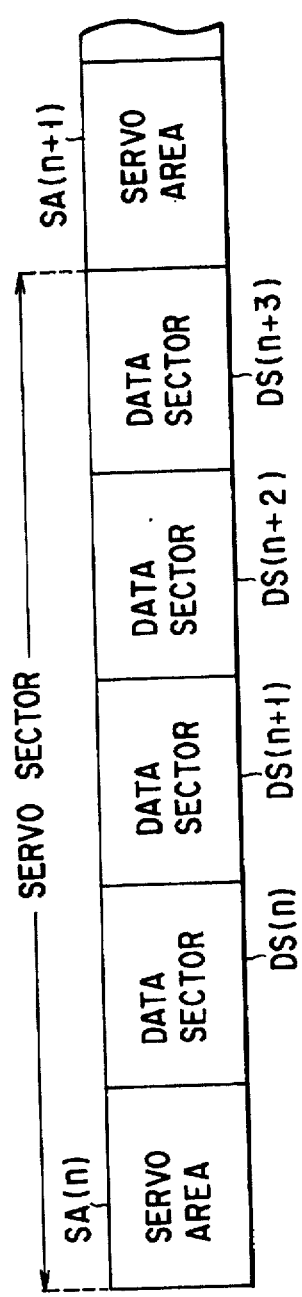
FIG. 2A
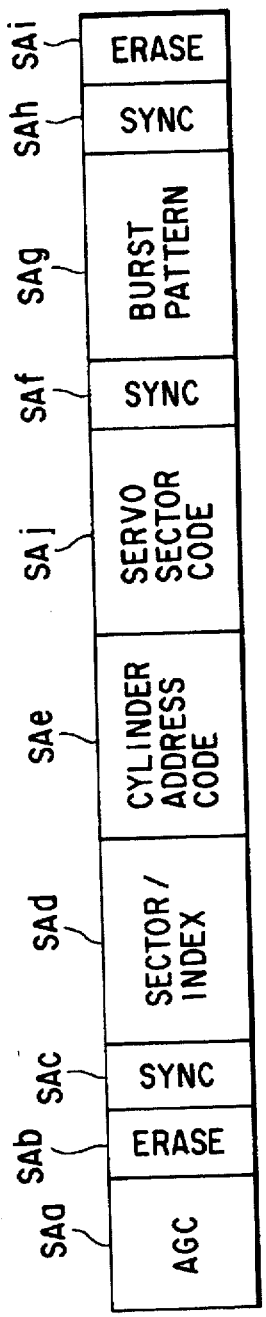
FIG. 2B
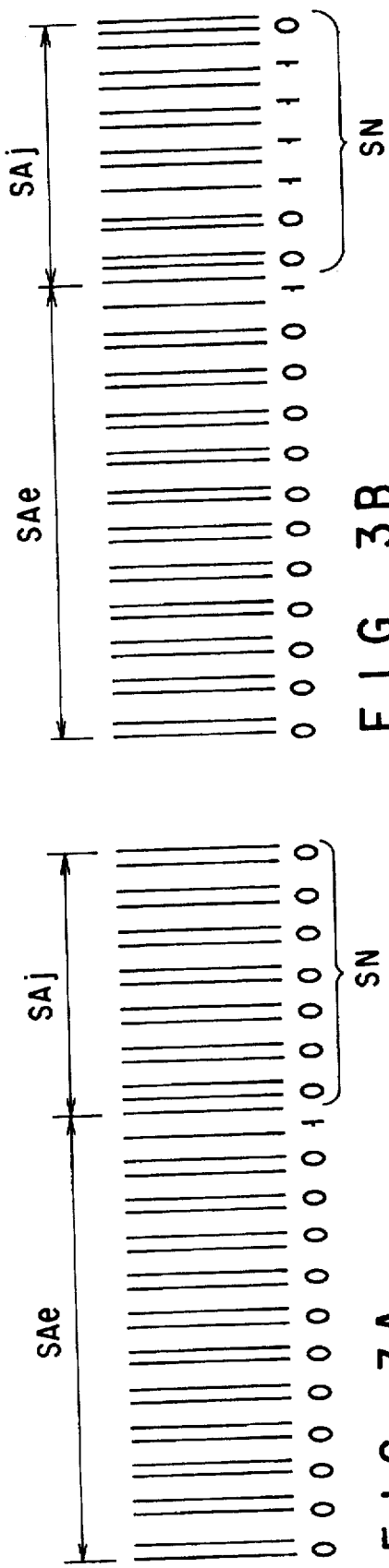
FIG. 3A
FIG. 3B

TABLE—A

| | SERVO SECTOR NUMBER | INITIAL COUNT VALUE (TS) | RELOAD COUNT VALUE (DN) |
|---|---|---|---|
| BASE ADDRESS | NO. 0 | $TS_0$ | $DN_0$ |
| | NO. 1 | $TS_1$ | $DN_1$ |
| | ⋮ | ⋮ | ⋮ |
| | NO. n | $TS_n$ | $DN_n$ |

FIG. 4A

TABLE—B

| ZONE NUMBER | RELOAD PERIOD VALUE (TP) |
|---|---|
| NO. 0 | $TP_0$ |
| NO. 1 | $TP_1$ |
| ⋮ | ⋮ |
| NO. n | $TP_n$ |

FIG. 4B

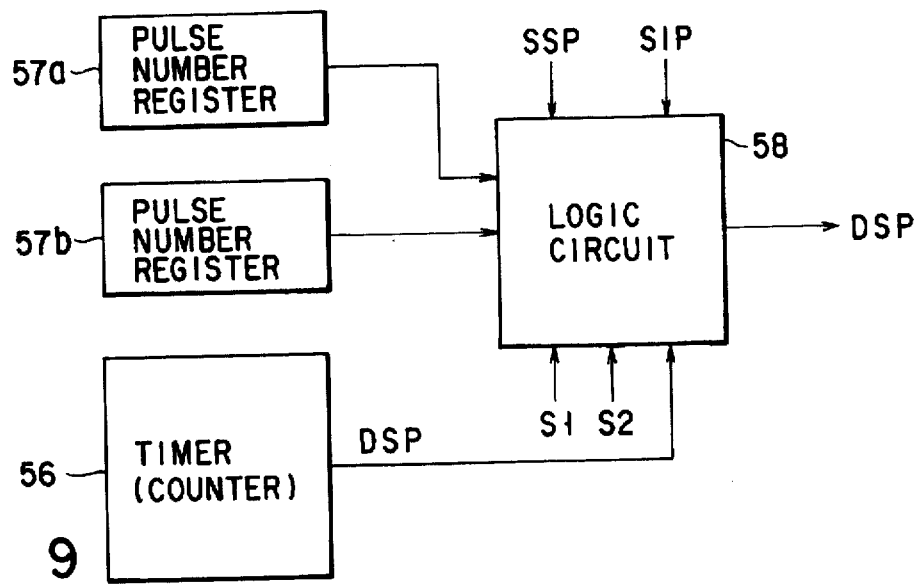
F I G. 9
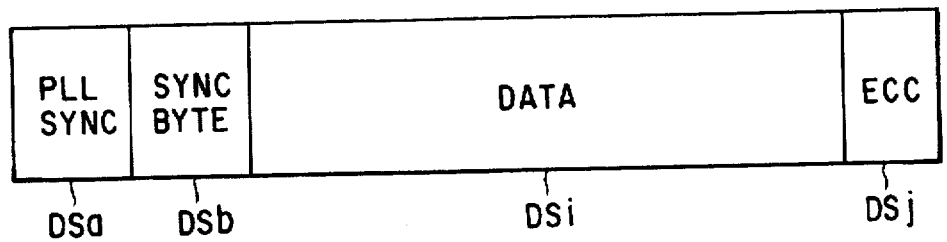
F I G. 12
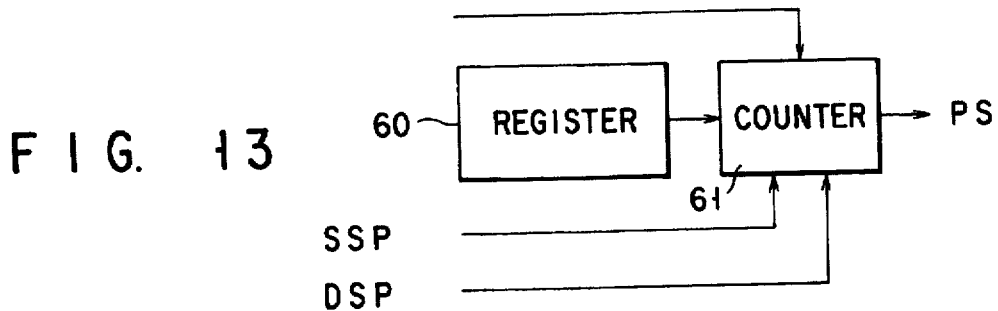
F I G. 13
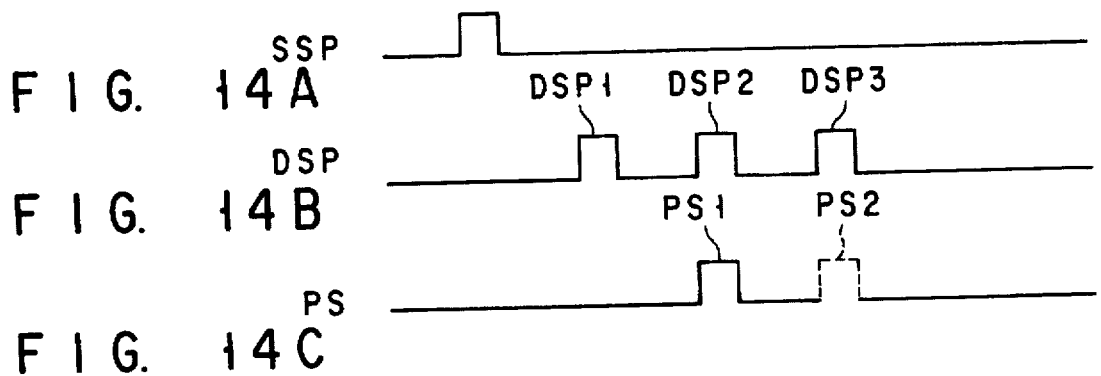
F I G. 14A
F I G. 14B
F I G. 14C

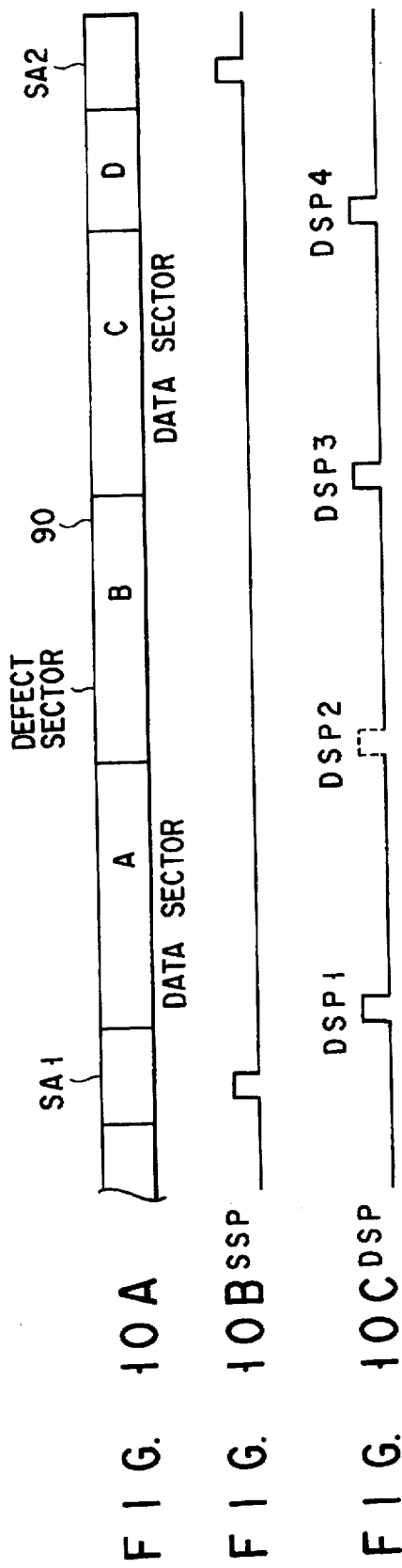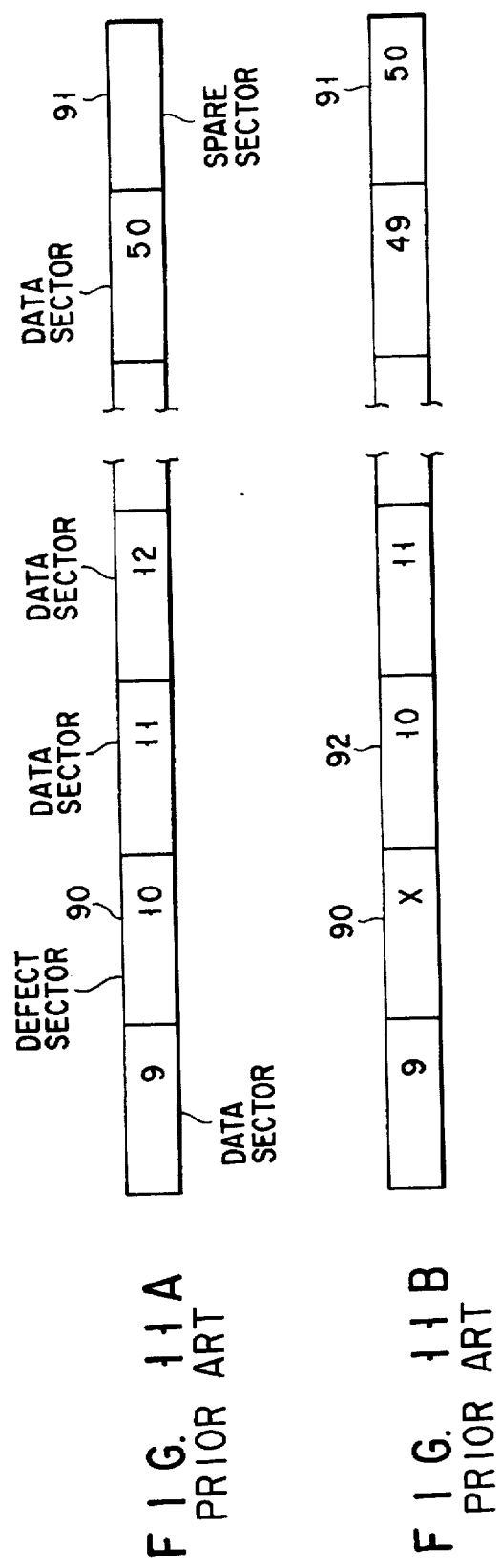

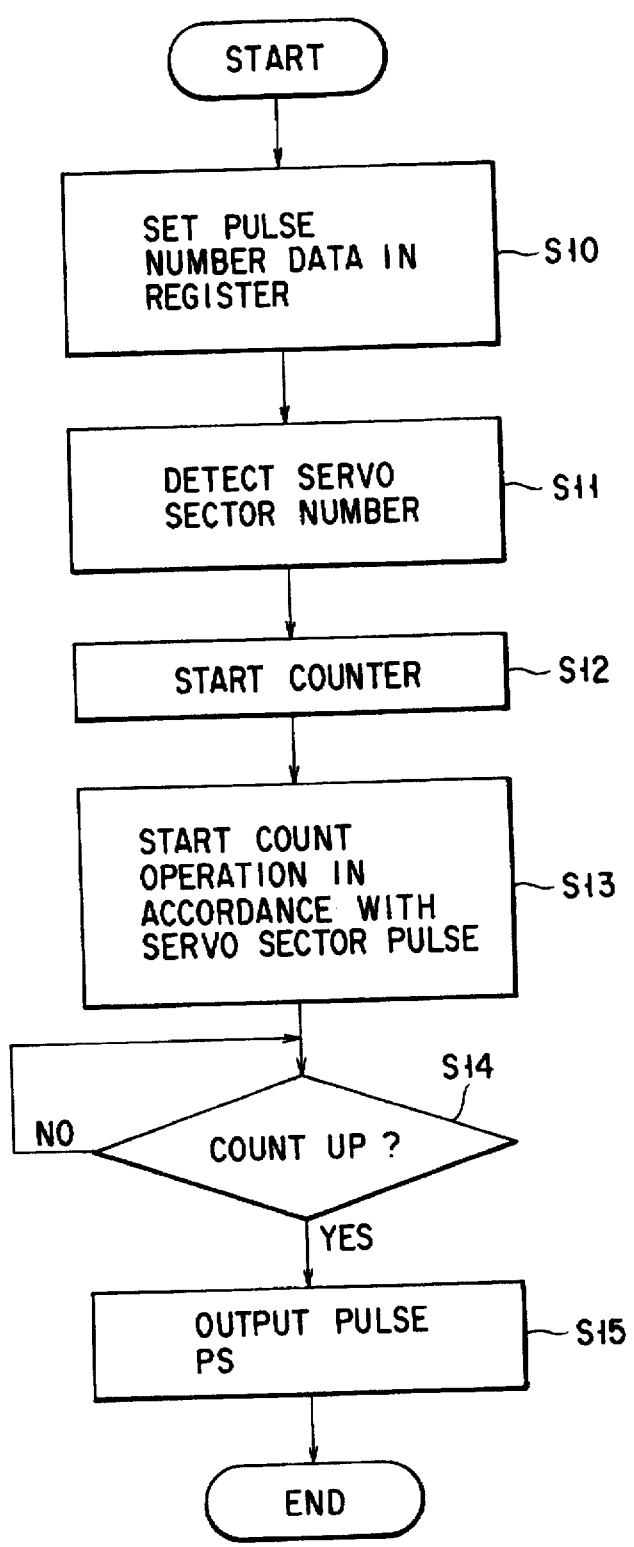
F I G. 16

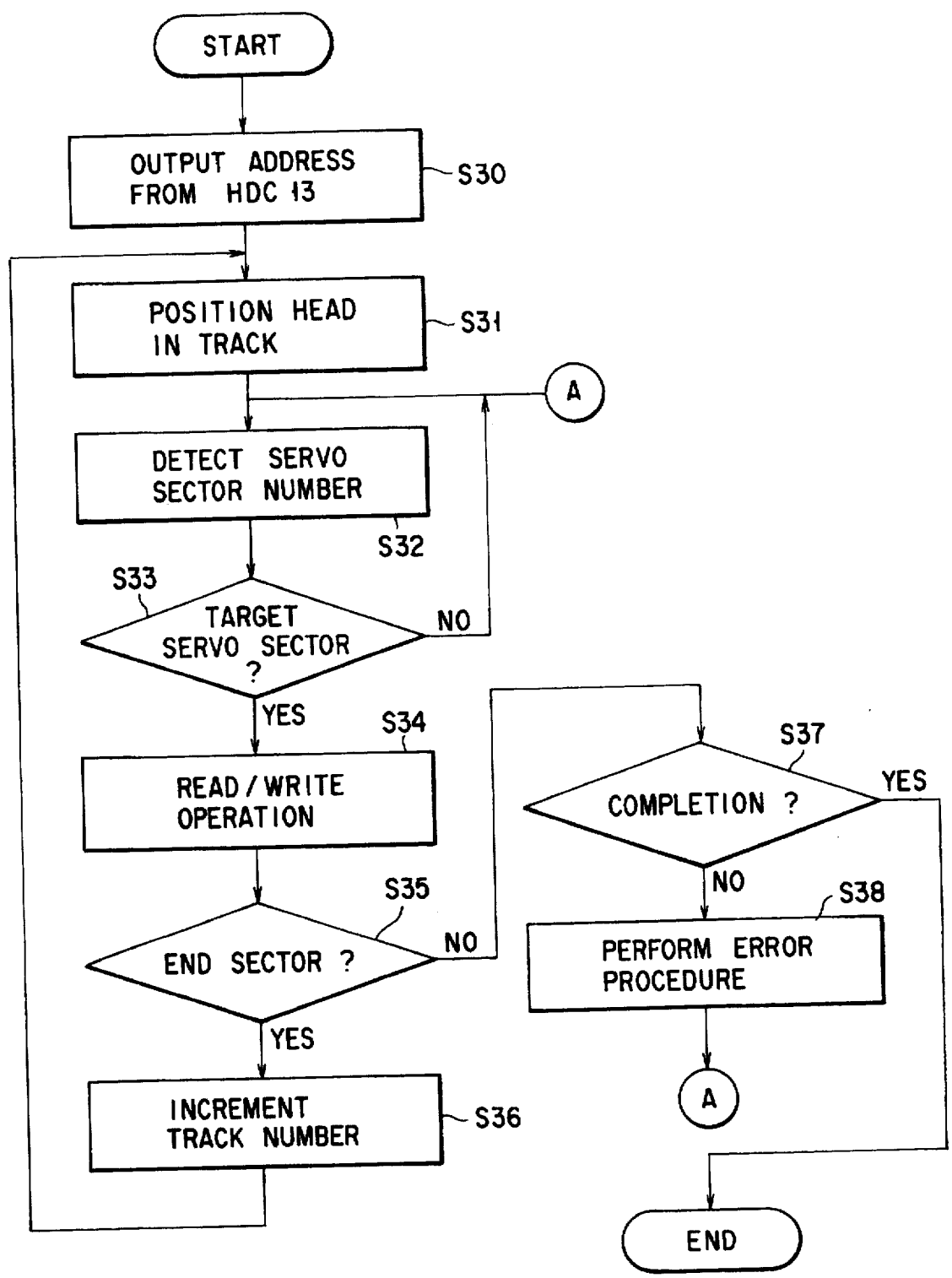
F I G. 20

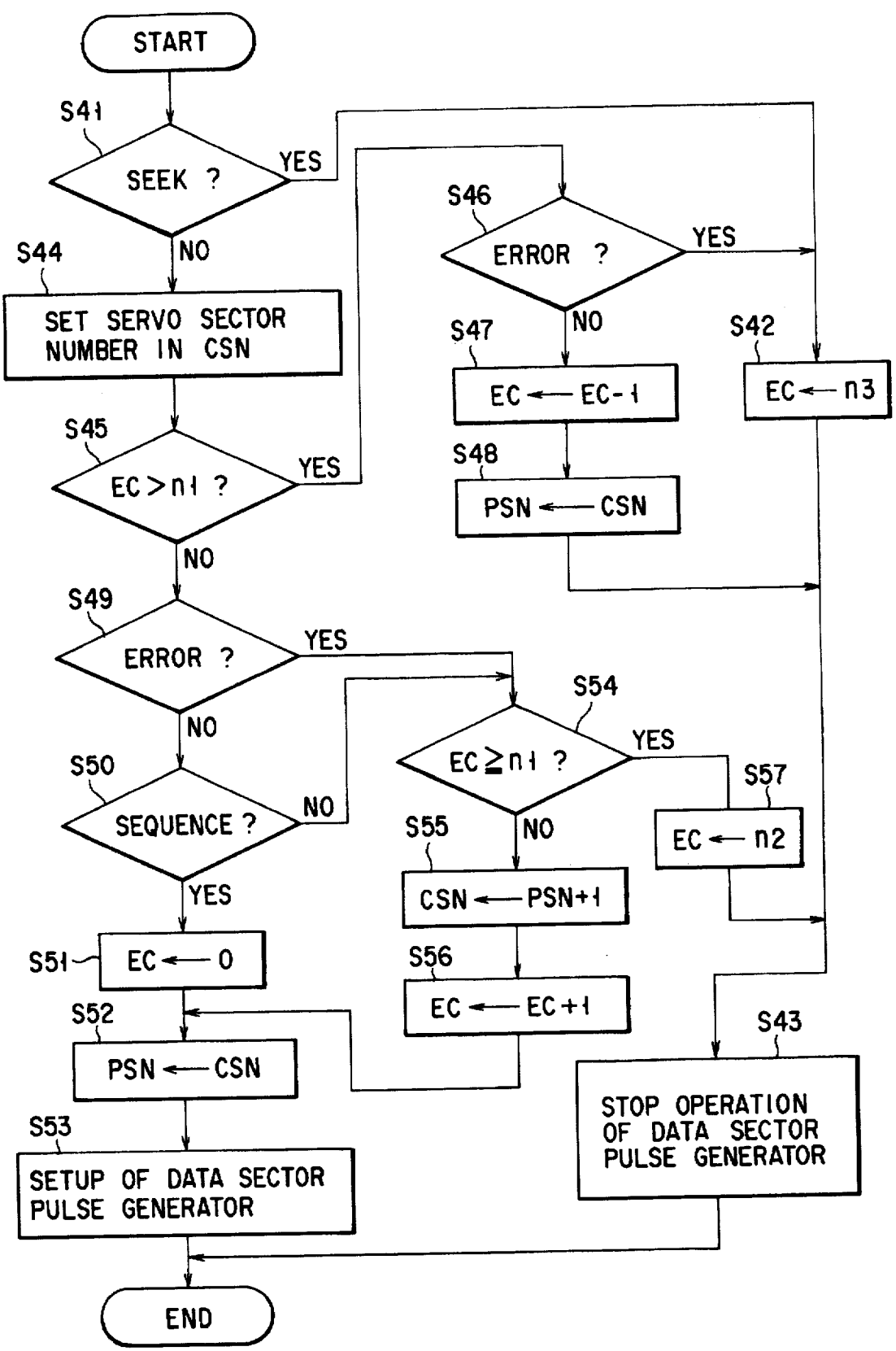
F I G. 21

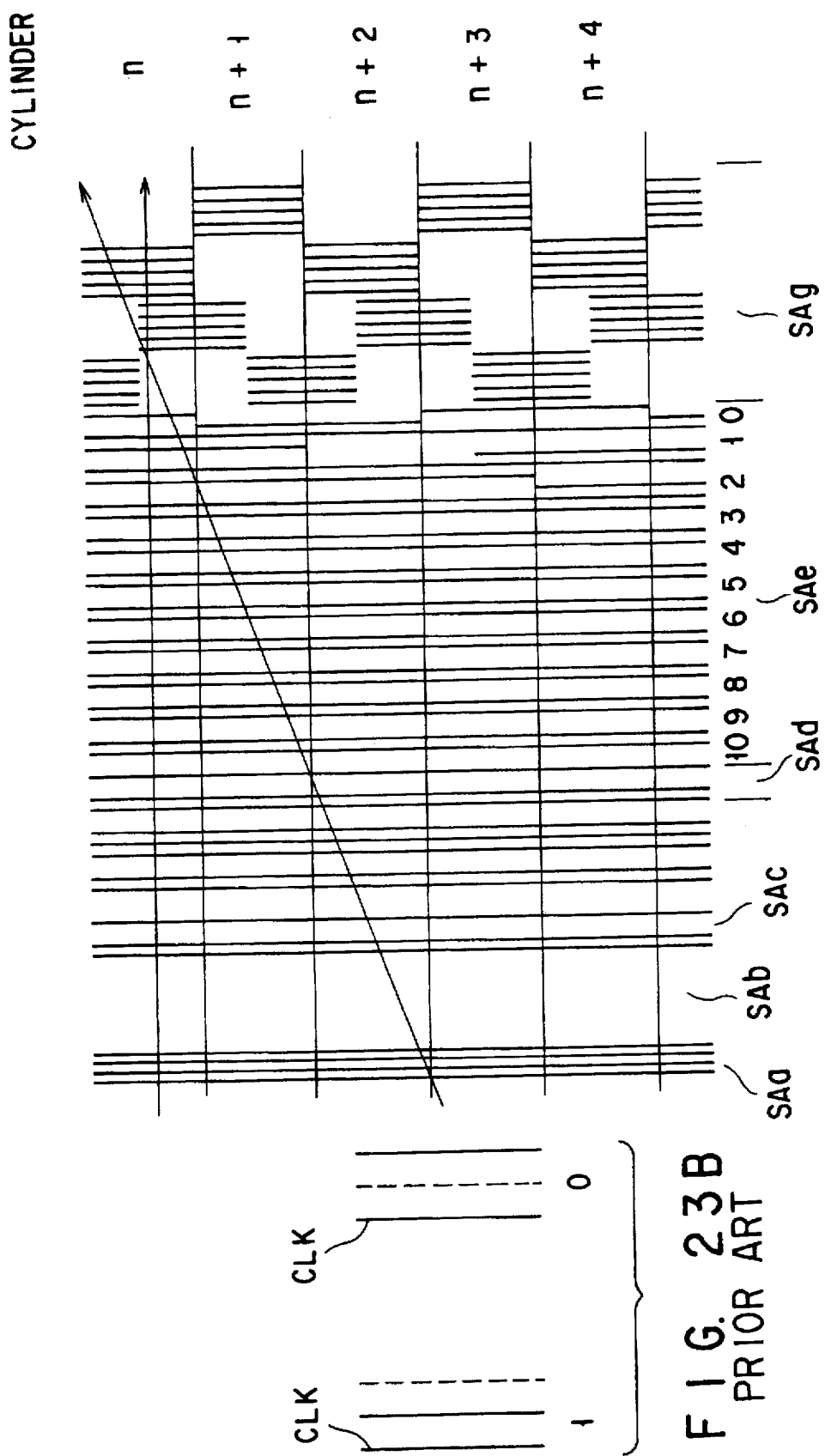

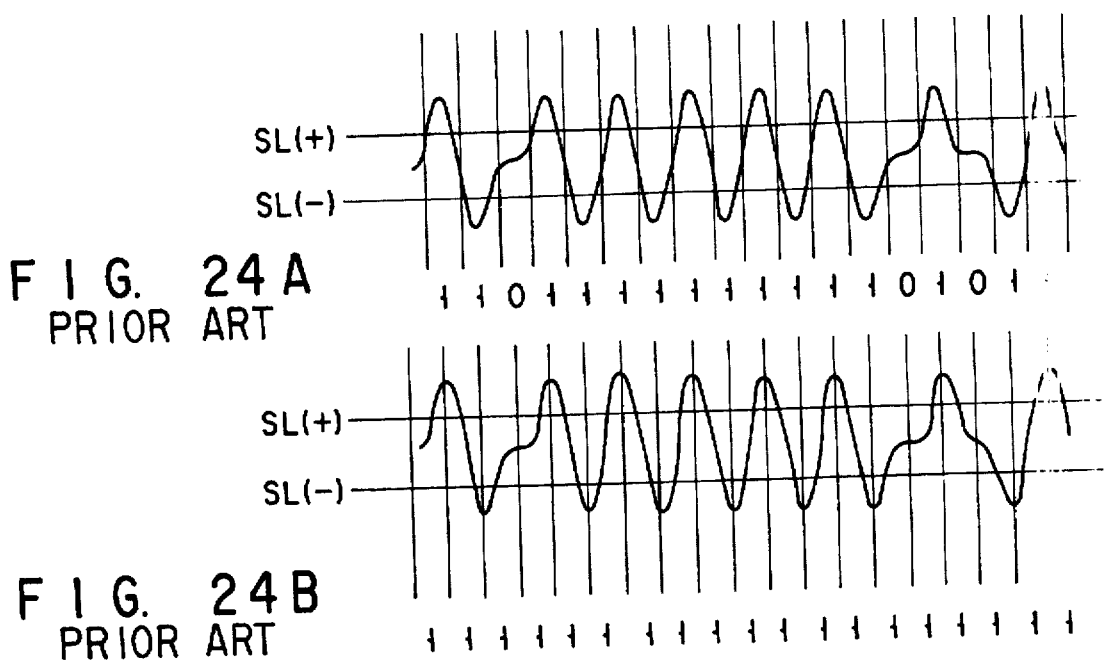
FIG. 24A PRIOR ART
FIG. 24B PRIOR ART
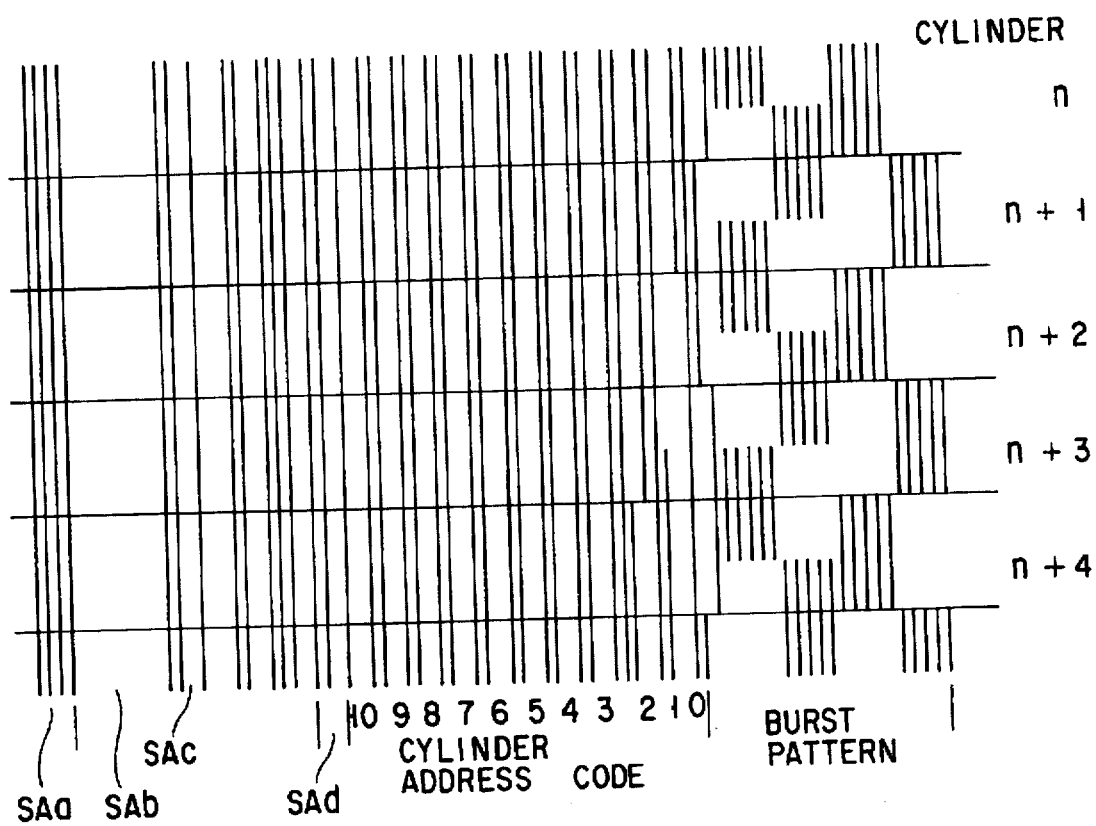
FIG. 26 PRIOR ART

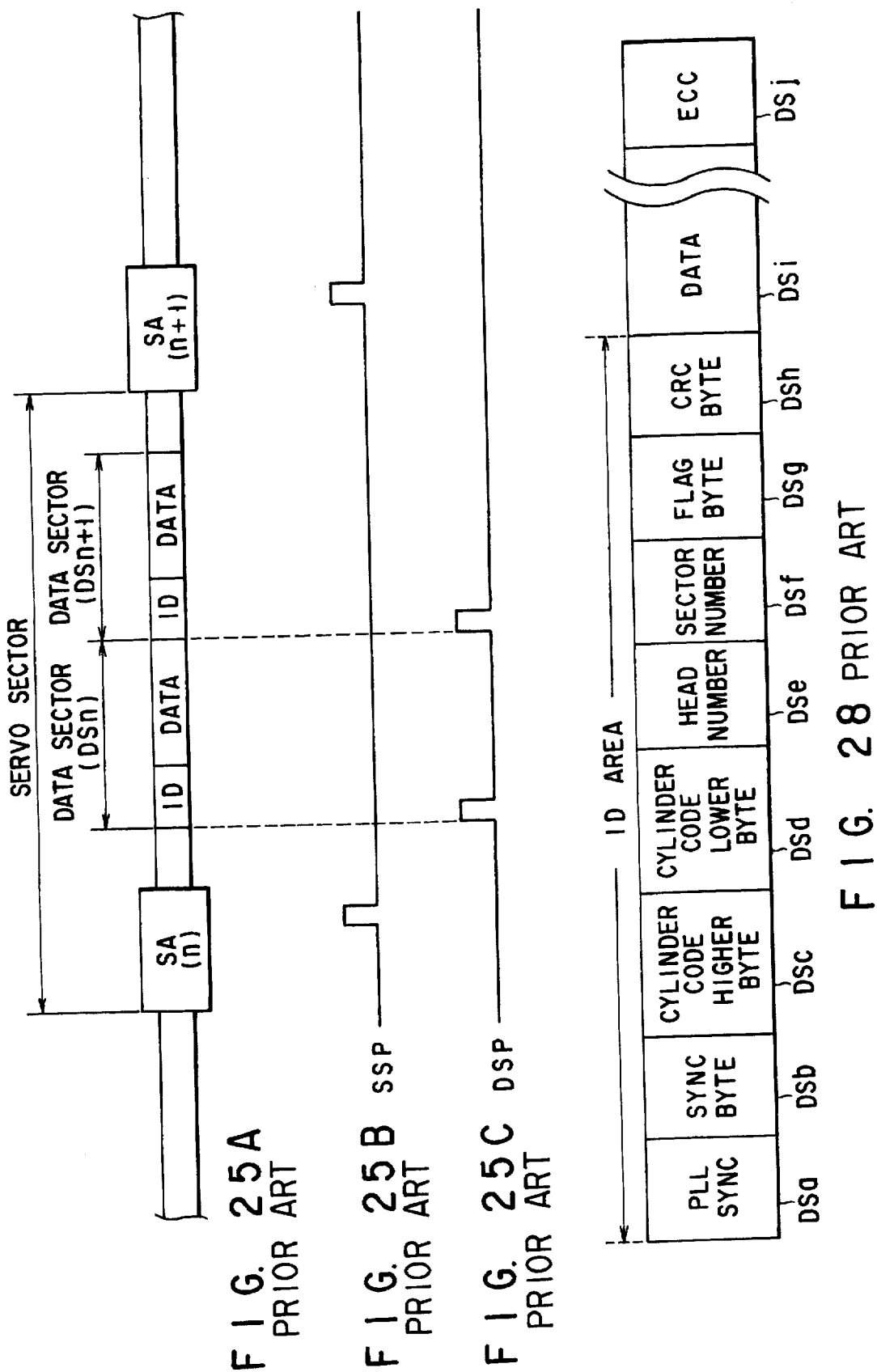

5,666,238

DATA SECTOR CONTROL APPARATUS AND METHOD FOR DISK STORAGE SYSTEM

This is a divisional application of application Ser. No. 08/363,705 filed on Dec. 23, 1994, now abandoned.

BACKGROUND OF THE INVENTION

1. Field of the Invention

The present invention relates to a disk storage system for performing control for positioning a head, used to record/reproduce data, at a designated position on a disk on the basis of servo data recorded on a plurality of servo areas set on the disk and, more particularly, a data sector control apparatus and method for a disk storage system designed to access a disk in units of sectors.

2. Description of the Related Art

In a disk recording/reproducing apparatus such as a hard disk drive (HDD), data is recorded/reproduced on/from a surface of a disk as a recording medium by a head. As shown in FIG. 30, a large number of tracks TR are formed on a disk 2 in the radial direction, and each track TR is divided into a plurality of sectors DS. In general, the upper and lower surfaces of one or plurality of disks 2 used in an HDD are used as data surfaces. Therefore, a plurality of tracks TR in the same axial direction are handled by the concept of a cylinder CL.

Each sector DS is roughly constituted by an ID area and a user data area. In addition, in an HDD of a sector servo scheme, a servo area SA on which servo data is recorded is set at the start portion of each sector DS. The servo area SA is radially recorded on the disk 2 for each sector DS of all the tracks TR (cylinders CL).

The servo area SA is an area used for positioning control of the head, and has a cylinder address code area SAe and a burst pattern area SAg, as shown in FIG. 29A. The servo system of the HDD executes seek control for moving the head to a target cylinder (target track) on the basis of a cylinder address code (track address code) reproduced from the cylinder address code area SAe by the head. When the head reaches the target cylinder, the servo system executes track following control for positioning the head to the center of the target cylinder on the basis of burst data (position data) reproduced from the burst pattern area SAg.

In addition to the above areas, the servo area SA includes an AGC area SAa, erase areas SAb and SAi, SYNC areas SAc, SAf, and SAh, and a sector/index area SAd. As shown in FIGS. 29B and 29C, the sector/index area SAd is an area in which a signal pattern for generating a servo sector pulse SSP or a servo index pulse SIP is recorded. The servo sector pulse SSP is a pulse output for each servo area SA. The servo index pulse SIP is a pulse serving as a reference point of the cylinder CL. This pulse is output only at a specific position (the start position of each track).

As shown in FIG. 28, the ID area of each sector DS has a PLL SYNC area DSa, a SYNC byte area DSb, a cylinder code (higher byte) area DSc, a cylinder code (lower byte) area DSd, a head number area DSe, a sector number area DSf, a flag byte area DSg, and a CRC byte area DSh.

A user data area DSi for recording user data follows the ID area. An ECC area DSj in which an ECC (error checking and correction) code is recorded is set after the user data area DSi. The ECC code is used for error detection and correction processing in reading data from the user data area DSi.

The PLL SYNC area DSa is an area for establishing synchronization with a data discrimination window before read-access to the ID area. On this area, a synchronization pattern having a predetermined frequency is recorded. The SYNC byte area DSb is an area in which information for establishing synchronization to demodulates an NRZ (non return to zero) code signal input upon establishment of synchronization in the PLL SYNC area DSa is recorded for each byte. In the HDD, read data reproduced by the head is converted into an NRZ code.

A cylinder code area is an area on which a cylinder address (cylinder number) corresponding to the sector DS is recorded. The higher eight bits of the cylinder address are recorded in the higher byte area DSc; and the lower eight bits, in the lower byte area DSd. The head number area DSe is an area in which a head number (byte) to be selected when the sector DS is accessed is recorded. In the sector number area DSf, a sector number (byte) for identifying the sector DS is recorded. The flag byte area DSg is an area for recording flag information or the like when an error is caused in the user data area DSi of the sector DS. The CRC byte area DSh is an area for recording a CRC (cyclic redundancy check) code for verifying the contents of a cylinder code, a head number, a sector number, and flag information when they are read.

Recently, an HDD of a CDR (constant density recording) scheme has been developed to realize a high data recording density. In the CDR scheme, as shown in FIG. 27, a disk 2 is divided into a plurality of zones (six zones Z1 to Z6 in this case for the sake of convenience) in the radial direction, and each zone includes several tens to several hundreds cylinders (tracks).

According to the sector arrangement of the CDR scheme, the recording density is made almost constant with respect to the estimated physical length of the circumference of each cylinder, and different data transfer rates are set for the respective zones.

Servo areas SA (seven areas SA0 to SA7 in this case) are radially recorded over the respective zones on the disk 2. Therefore, the servo area SA is not necessarily located at the start portion of each sector. For example, in the zone Z1, the servo area SA0 is located at the start portion of the data sector DS0, whereas the servo area SA1 is located in front of a portion of the data sector DS3.

In other words, in the CDR scheme, the servo area SA is handled by the concepts of a reference servo sector and the data sectors DS included in each servo sector. In general, a plurality of data sectors DS having consecutive sector numbers are included by each servo sector. As shown in FIG. 27, for example, in the servo areas SA0 and SA1, the data sector DS3 having sector number 3 may be divided into portions and included in the respective servo areas SA0 and SA1. In addition, the ID areas of the respective data sectors differ in position between the respective zones.

In the HDD, when the head is positioned at a target cylinder on the basis of servo data, a read operation of reading ID information from the ID area of a designated sector to access the sector. In this read operation, when a predetermined voltage is detected in a read signal from the head within a predetermined period of time, it is determined that information "1" is read.

More specifically, as shown in FIG. 24A, a read signal which exceeds a predetermined slice level (qSL) for a predetermined period of time is detected as information "1". In this case, if a data discrimination window is synchronous with magnetic recording on the disk 2, proper information can be detected from the read signal. If, however, the data discrimination window is not synchronous with magnetic recording on the disk 2, as shown in FIG. 24B, erroneous information is detected from the same read signal. As shown in FIG. 28, the PLL SYNC area DSa is set to establish synchronization between the data discrimination window and magnetic recording.

Servo data like the one shown in FIG. 29A is recorded on each servo area SA. As shown in FIG. 26, a cylinder address code and a burst pattern are recorded, as magnetic patterns, for each cylinder.

In the HDD of the CDR scheme described above, as shown in FIG. 25A, a plurality of data sectors DS are present between the servo areas SA, and one of the data sectors may include only a portion of a data area. The HDD outputs the servo sector pulse SSP (or the servo index pulse SIP) at the read timing of the servo area SA, and outputs a data sector pulse DSP at the read timing of the data sector ID.

In the HDD, as shown in FIG. 29A, gain adjustment of the circuit is performed in the AGC area SAa of the servo area to adjust the amplitude of an output signal to be constant. The SYNC area SAc is then detected upon detection of the erase area SAb, thereby completing preparation for a servo data read operation. The start position of a servo data operation is a position called a start bit immediately after the SYNC area SAc. Synchronization of the circuit is established by using this start bit, and the servo sector pulse SSP or the servo index pulse SIP is output in accordance with the pattern of the sector/index area SAd following the start bit.

A cylinder address code (cylinder code) is generally recorded by a coding scheme using gray codes. A gray code is a binary code designed such that when consecutive numerical values are expressed in binary notation, the adjacent binary values are different from each other by only one bit. More specifically, for example, decimal numbers "6", "7", and "8" are expressed as gray codes "00101", "00100", and "01100". As a general mathematical expression, an ith bit Gi of a gray code is "Gi=Bi XOR Bi+1", where Bi and Bi+1 are the ith and (i+1)th bits obtained when a decimal number is converted into a binary number, and XOR indicates exclusive OR processing.

With the use of Such a gray code, although a cylinder address code is accessed when the head is to be moved to a target cylinder, the difference between read data can be set within one cylinder. More specifically, as shown in FIG. 23A when the head crosses cylinder "n+2" and cylinder "n+1", the same cylinder address code as that obtained when the head is located over a cylinder n is read.

Referring to FIG. 23A, a cylinder address code is recorded, as a gray code, in the cylinder address code area SAe. In addition, a position signal (burst data) for detecting a position shift amount with respect to the center of the target cylinder on the basis of the amplitude of an output signal is recorded in the burst pattern area SAg.

FIG. 23B shows the actual recorded state of a cylinder code converted into a gray code. In this case, when a signal is output in the area of the next data discrimination window after a clock bit (CLK) is generated, the corresponding pattern is recognized as information "1". In contrast to this, when no signal is output in the area of the next data discrimination window, but a signal is output in the next area, the corresponding pattern is recognized as information "0".

In the conventional HDDs including the HDD of the CDR scheme, when designated data on the disk 2 is to be accessed, the ID information of an ID area is referred to first. When the corresponding sector is recognized as a target sector in accordance with this ID information, access to the data area following the ID area is executed. In this case, if access is not performed from the start position of the ID area, the ID information of the ID area cannot be read.

An HDD disk of the CDR scheme is disadvantageous, however. It is necessary to provide an ID area for each data sector on the disk 2. The area which the disk 2 has to store user data is inevitably reduced by the sum of the ID areas provided for the data sectors formed on the disk 2.

As shown in FIG. 28, if, for example, access is started from the cylinder code area DSd, since synchronization on the circuit cannot be established by using the PLL SYNC area DSa, synchronization between the data discrimination window and magnetic recording cannot be established. For this reason, as shown in FIG. 25C, the data sector pulse DSP must be generated to detect the start position of a data sector, thereby reliably accessing the data. As a scheme of detecting the first position of a data sector, a scheme is available, in which specific information called an address mark is recorded on the disk 2 in advance, and the start position of the data sector is determined in accordance with detection of this specific information. In this scheme, however, an area for recording an address mark must be prepared on the disk 2. Therefore, the data recording area is reduced by the address mark area.

According to another scheme, a count operation is started at the moment when a servo index pulse for a servo area is generated, and the position of the servo area is specified by a number corresponding to the count value, thereby determining the start position of a data sector. In this scheme, however, if servo sector pulses are not consecutively generated, a count operation cannot be accurately performed. In general, if servo sector pulses are not consecutively generated within a timer interval 1.2 times the time interval for generation of servo sector pulses, it is determined that pulse omission has occurred for some reason. Even if, for example, a servo pulse is generated after five pulses are consecutively omitted, the corresponding position cannot be accurately specified. This is because there is an error in the general time interval for generation of pulses. If, for example, a pulse is generated immediately after omission of five consecutive pulses is measured, the number of consecutively omitted pulses in the actual measurement time is five. In practice, however, the generated pulse corresponds to the sixth pulse from the position where the pulse omission has started. Therefore, an error may be caused in a simple count operation.

In addition, when a head switching operation is executed, counting of a servo number may be erroneously performed depending on the head switching timing. This is because the positions, on the upper and lower surfaces of the disk 2, where servo data are recorded may not coincide with each other. More specifically, as shown in FIG. 22, assume that a head 1a corresponds to side A of the data surfaces of the disk 2, and a head 1b corresponds to side B of the data surfaces. In this case, when switching for access is performed from the head 1a to the head 1b, servo number "10" of the servo area SA may not coincide with count value "11".

SUMMARY OF THE INVENTION

It is the first object of the present invention to accurately detect the first position of a data sector without forming a special area, on a disk, used to record an address mark. It is the second object of the present invention to accurately detect the start position of a data sector and accurately identify a data sector to be accessed, even if the scheme of omitting ID information from an ID area is employed. It is the third object of the present invention to reliably realize defect processing with respect to a defect sector when the scheme of omitting ID information from an ID area is employed. It is the fourth object of the present invention to accurately detect the start position of a data sector corresponding to an identified servo area, without forming a special area, on a disk, used to record an address mark or even if servo sector pulses are not consecutively generate, by identifying the servo area on the basis of servo code information for each servo area, which is recorded in advance at a predetermined position in each servo area recorded on the disk, and accurately perform detection of the start position of a data sector even if servo code information is not properly extracted. It is the fifth object of the present invention to reliably infer correct servo code information when servo code information cannot be properly extracted. It is the sixth object of the present invention to inhibit a series of operations of determining the start operation of a data sector during a seek operation in which the start position of a data sector need not be determined, thereby omitting unnecessary processing and reducing the load on a CPU, especially when the series of operations are to be performed by the CPU. It is the seventh object of the present invention to inhibit unstable inference of servo code information.

According to the principal characteristic of the present invention, there is provided a data sector control apparatus for a disk storage system having a servo system which performs control for positioning a head by use of servo data, the apparatus comprising: a disk having a plurality of tracks concentrically formed in a radial direction, each track having a format constituted by a plurality of servo areas in which the servo data are recorded and which are arranged at predetermined intervals, and a predetermined number of data sectors arranged between the servo areas, each servo area having servo sector information recorded therein, and the servo sector information being used to identify the data sector; and data sector access means for detecting and accessing a data sector by using servo sector information read by the head, the data sector being used to record/reproduce data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and detailed description of the preferred embodiments given below, serve to explain the principles of the invention.

FIG. 2A is a view showing a disk format in the present invention;

FIG. 2B is a view showing the format of a servo area in the present invention;

FIGS. 3A and 3B are views, each showing the format of a servo area in the present invention;

FIGS. 4A and 4B are views showing the contents of tables stored in a ROM in the system of the present invention;

FIG. 9 is a block diagram showing the arrangement of a circuit for executing defect processing of a data sector in the present invention;

FIGS. 10A to 10C are timing charts for explaining defect processing of a data sector in the present invention;

FIGS. 11A and 11B are timing charts for explaining conventional defect processing of a data sector;

FIG. 12 is a view showing the format of a data sector from which an ID area is omitted in the present invention;

FIG. 13 is a block diagram showing the arrangement of a reference pulse generator according to the present invention;

FIGS. 14A to 14C are timing charts for explaining the operation of the reference pulse generator according to the present invention;

FIG. 16 is a flow chart for explaining the operation of the reference pulse generator according to the present invention;

FIG. 20 is a flow chart for explaining the operation of the modification of the track skew system according to the present invention;

FIG. 21 is a flow chart for explaining a servo sector number inference scheme according to the present invention;

FIGS. 23A and 23B are views for explaining the conventional arrangement of a servo area;

FIGS. 24A and 24B are timing charts for explaining a conventional data reproducing operation;

FIGS. 25A to 25C are timing charts for explaining a disk format in a conventional CDR scheme;

FIG. 26 is a view for explaining the conventional arrangement of a servo area;

FIG. 28 is a view showing the conventional arrangement of an ID area;

DETAILED DESCRIPTION OF THE PREFERRED EMBODIMENTS

An embodiment of the present invention will be described below with reference to the accompanying drawings. In this embodiment, a hard disk system is assumed to be a disk storage system, and the present invention is applied to a disk drive (HDD) of a CDR scheme.

(Arrangement of Disk Storage System)

Figure 1:
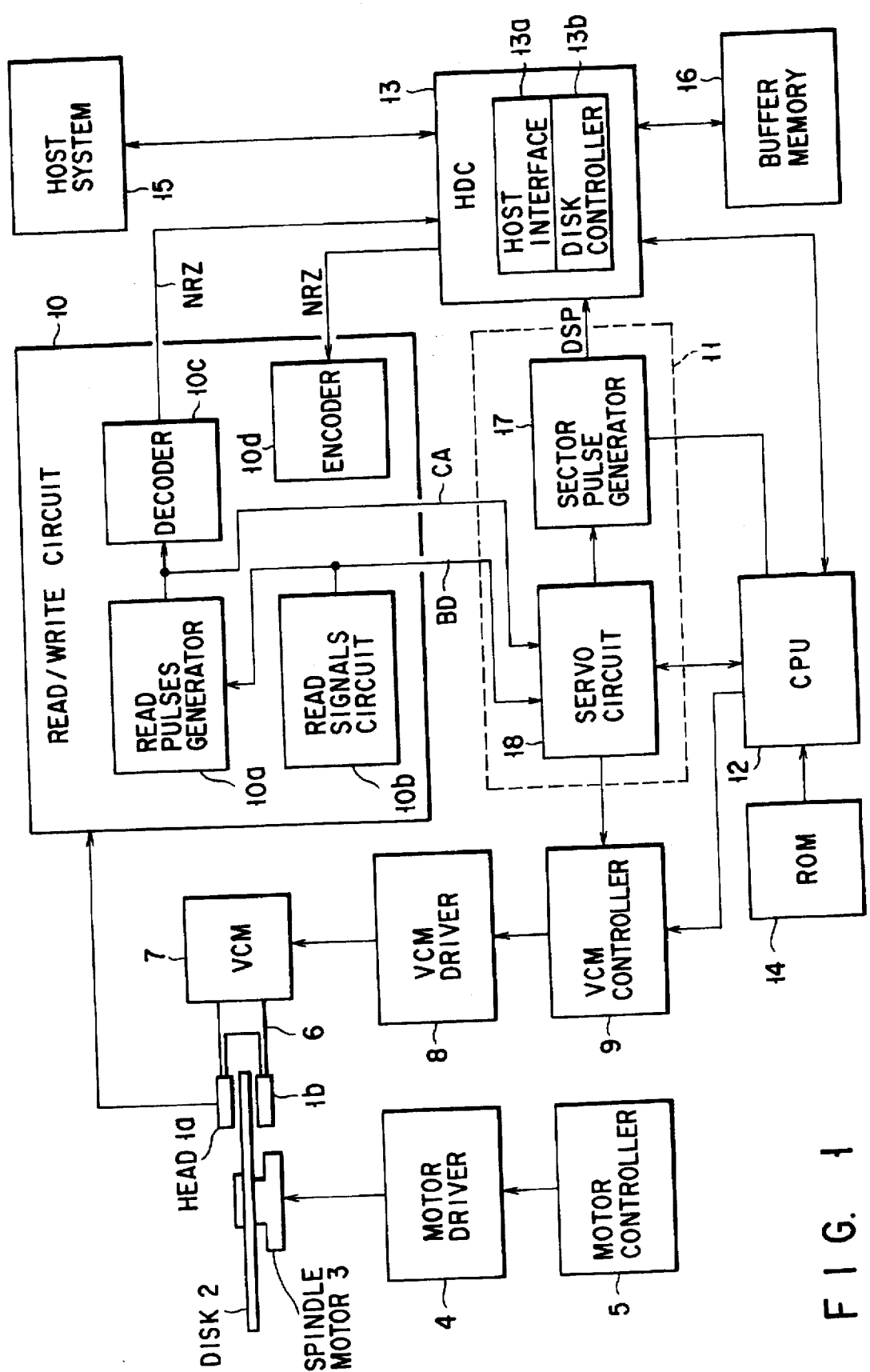
FIG. 1 is a block diagram showing the main part of a hard disk system of the present invention.

As shown in FIG. 1, the HDD of this embodiment includes a disk rotating mechanism for rotating/driving a disk 2 as a recording medium, a servo mechanism for positioning heads 1a and 1b to a target cylinder on the disk 2, and a read/write circuit 10 for recording/reproducing data. The disk rotating mechanism is constituted by a spindle motor 3 for rotating/driving the disk 2, a motor driver 4, and a motor controller 5.

The servo mechanism is constituted by an actuator 6 for holding the heads 1a and 1b, a voice coil motor (VCM) 7 for driving the actuator 6, a VCM driver 8 for driving the VCM 7, a VCM controller 9, a servo circuit 18, and a microprocessor (CPU) 12.

The servo mechanism rotates/drives the actuator 6 of, e.g., a rotary type to move the heads 1a and 1b in the radial direction of the disk 2 under the control of the CPU 12. With this operation, the heads 1a and 1b are positioned to a designated target cylinder on the disk 2.

The servo circuit 18 is a servo data processing circuit for performing control for positioning the heads 1a and 1b to a target cylinder. In general, the servo circuit 18 and a sector pulse generator 17 (to be described later) are integrated into a gate array. The servo circuit 18 extracts cylinder address code CA and burst data BD from servo data reproduced by the read/write circuit 10 and outputs them to the CPU 12. Furthermore, the servo circuit 18 extracts a servo sector code (to be described later) from the servo data reproduced by the read/write circuit 10 and outputs it to the CPU 12.

The CPU 12 outputs a control amount for executing seek control of positioning control to the VCM controller 9 on the basis of the cylinder address code CA. The CPU 12 also outputs a control amount for executing track following control of positioning control to the VCM controller 9 on the basis of the burst data BD.

The read/write circuit 10 is constituted by a read circuit for processing read signals read by the heads 1a and 1b, and a write circuit for processing write data output from an HDC 13. The read circuit is roughly constituted by a read signals circuit 10b, a read pulses generator 10a, and a decoder 10c. The read signals circuit 10b has an AGC (automatic gain control) amplifier for holding a read signal amplified by a head amplifier at a predetermined level, and a low-pass filter (LPF) for removing noise. The servo circuit 18 samples/holds the burst data BD from a read signal output from the LPF of the read signals circuit 10b, and outputs it to the CPU 12 upon analog/digital conversion.

The read pulses generator 10a converts the read signal output from the read signals circuit 10b into a read pulse string, and further executes processing of separating the read pulse string into a data pulse and a clock pulse. The decoder 10c converts the data pulse generated by the read pulses generator 10a into read data (NRZ code data) and outputs the data to the HDC 13. The servo circuit 18 extracts the cylinder address code CA from the read pulse output from the read pulses generator 10a.

The write circuit has an encoder 10d and converts the NRZ code write data transferred from the HDC 13 into an RLL (run length limited) code. The write circuit also converts the RLL code into an analog write current and supplies it to the heads 1a and 1b. The heads 1a and 1b generate a recording magnetic field corresponding to the write data by using the write current and record the data on the disk 2.

The CPU 12 executes the above seek control and track following control on the basis of programs stored in a ROM (read only memory) 14. In addition, the CPU 12 controls the sector pulse generator 17 by using tables (see FIGS. 4A and 4B) stored in the ROM 14 in advance.

The HDC 13 is constituted by a host system (computer) 15, a host interface 13a serving as an interface with the HDD, and a disk controller 13b for executing recording/reproduction control of the HDD. The HDC 13 executes access control for accessing the disk 2 in units of sectors in accordance with an access request (command) from the host system 15.

The HDC 13 temporarily stores accessed read data or write data in a buffer memory 16 in units of sectors. The buffer memory 16 is a RAM (random access memory) also called a sector buffer.

The HDC 13 transfers read data to the host system 15, and write data to the read/write circuit 10. The HDC 13 executes address conversion processing of converting a logical address from the host system 15 into a physical address. A physical address is an address consisting of a head number, a zone number, a cylinder number, a sector number, and the like which are used to access a data sector in reading/writing data from/in the disk 2.

As will be described later, when a defect sector is present, the HDC 13 has defect information for designating a defect sector, and executes defect processing of using a spare sector as a substitute for the defect sector.

(Disk Format)

Figure 27:
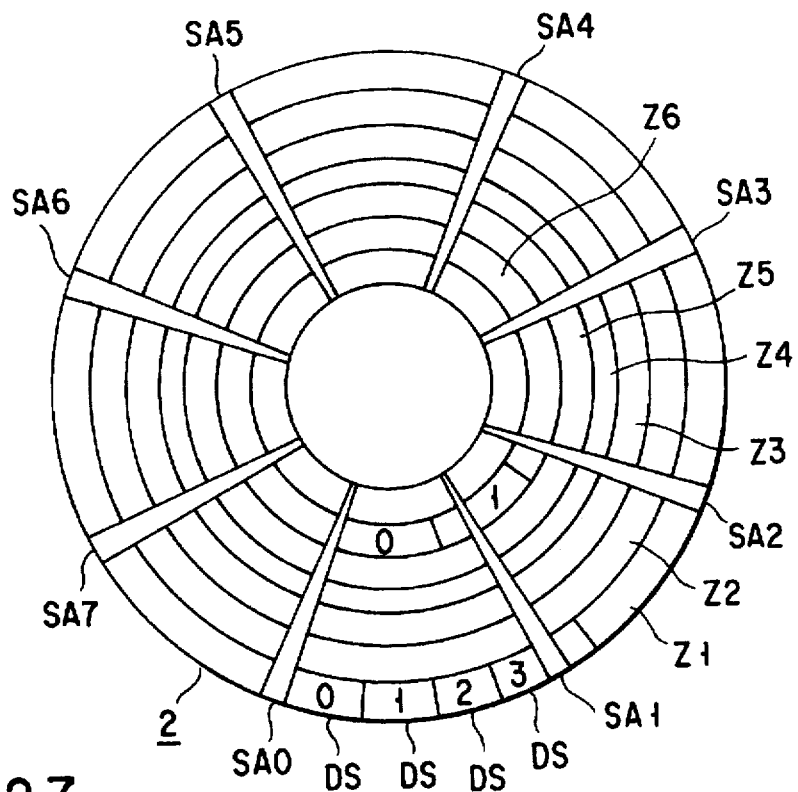
FIG. 27 is a view for explaining a disk format in a conventional CDR scheme.
Figure 30:
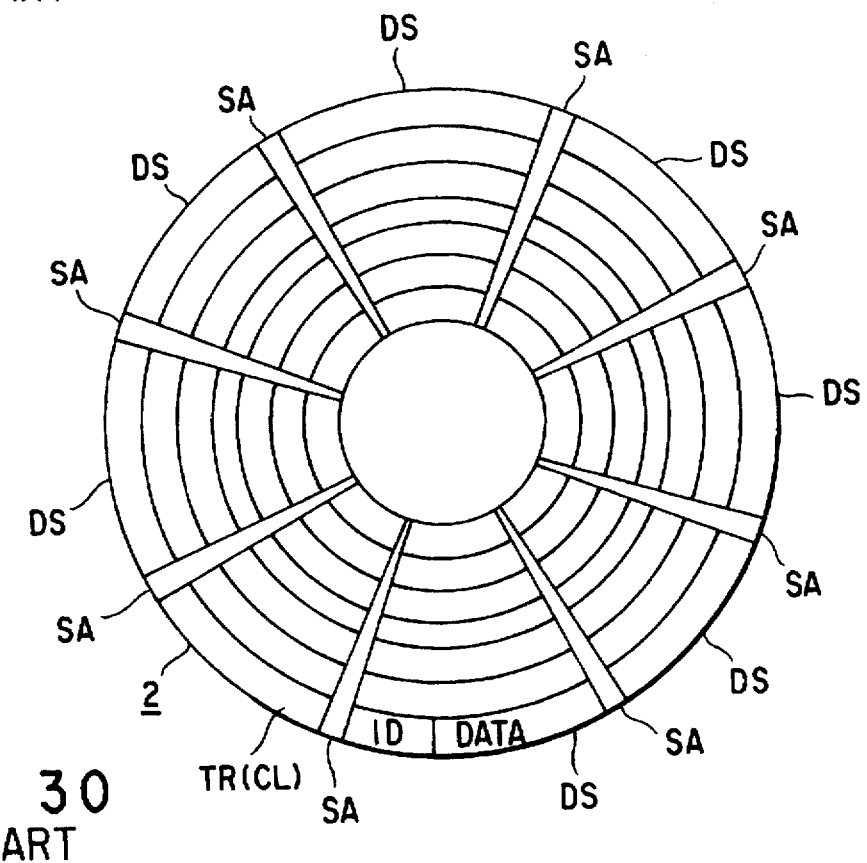
FIG. 30 is a view for explaining a conventional disk format.
Figures 29A, 29B, 29C:
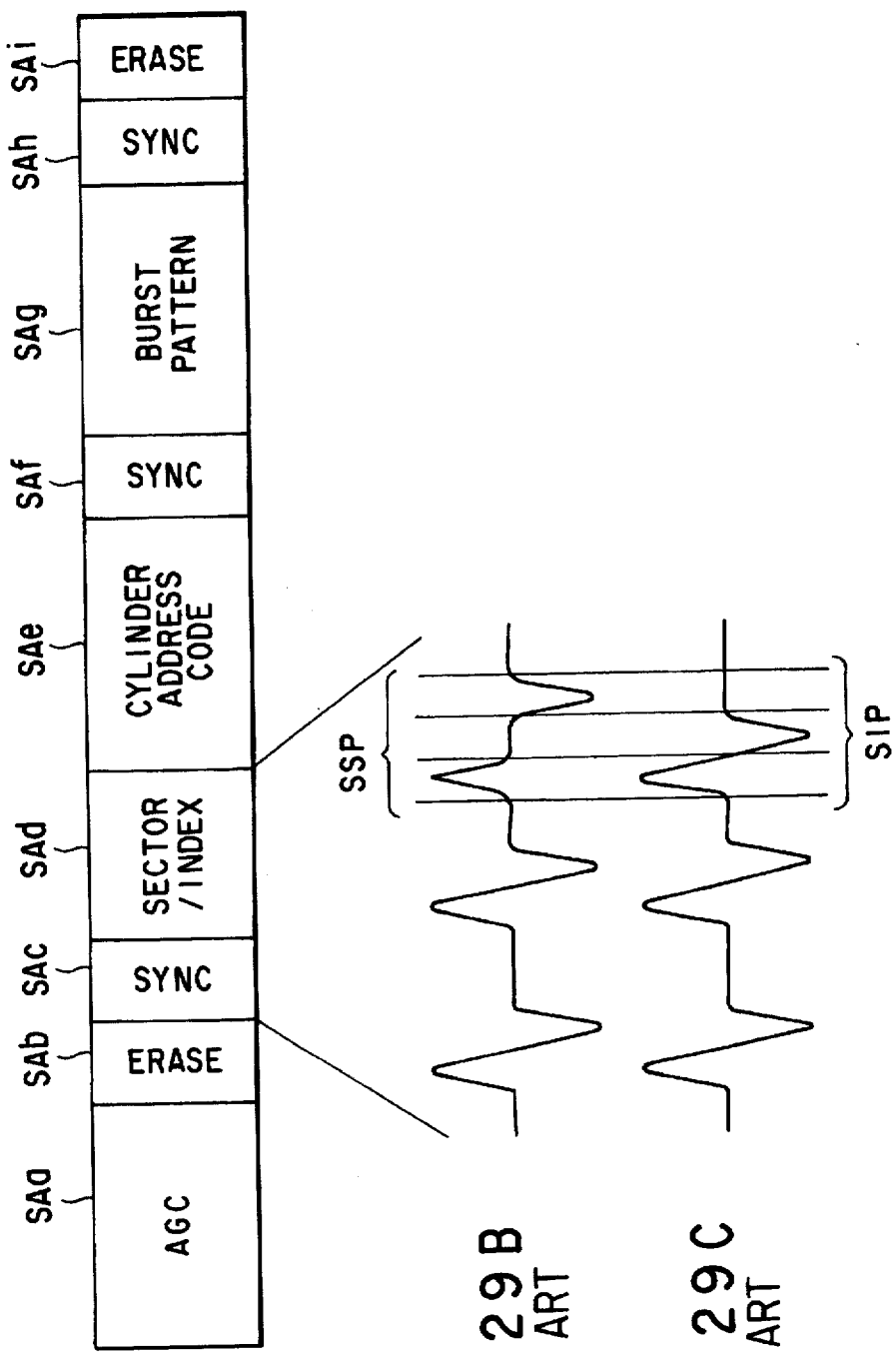
FIGS. 29A to 29C are views for explaining the conventional arrangement of a servo area.

In the present invention, the disk 2 has a CRD scheme format like the one shown in FIG. 27. As shown in FIG. 2A, a plurality of data sectors (four sectors in this case) DS are arranged, as one servo sector, between servo areas SA in each track (cylinder).

In addition, according to the present invention, as shown in FIG. 2B, an area SAj, on which a servo sector code (servo sector number SN) is recorded, is arranged in each servo area SA. A servo sector number SN is code information for identifying a servo sector with reference to the respective servo areas (SA0 to SA7).

In this embodiment, "0" is assigned as a reference servo sector number SN, and "1" to "7" are respectively assigned as servo sector numbers SN.

In the embodiment, the servo sector number SN is recorded in the area SAj adjacent to a cylinder address code area SAe, as shown in FIGS. 3A and 3B. The servo sector number SN is recorded by using a gray code, similar to a cylinder address code. Since a gray code system is different from a general numerical system, a predetermined conversion procedure is required to reproduce a gray code as consecutive numbers. If, however, the conversion method corresponds to the same system as that of cylinder address codes, a circuit for demodulating numerical values can be uniquely determined.

(Arrangement of Sector Pulse Generator 17)

Figure 5:
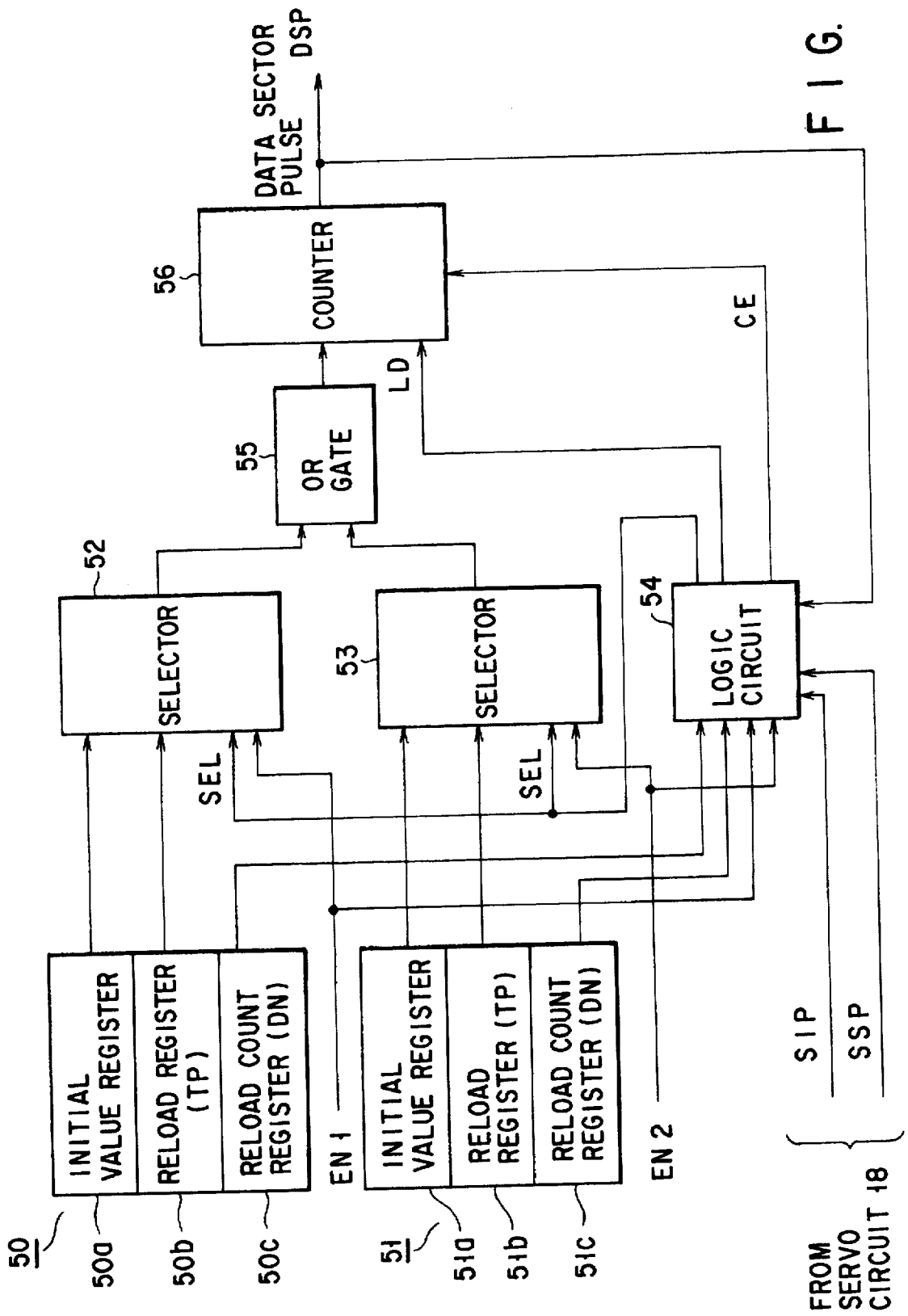
FIG. 5 is a block diagram showing the arrangement of a data sector pulse generator according to the present invention.

As shown in FIG. 5, the sector pulse generator 17 includes first and second register groups 50 and 51, first and second selectors 52 and 53, a logic circuit 54, an OR gate 55, and a counter (timer) 56.

The first and second register groups 50 and 51 are respectively constituted by initial value registers 50a and 51a, reload registers 50b and 51b, and reload count registers 50c and 51c.

Figure 8:
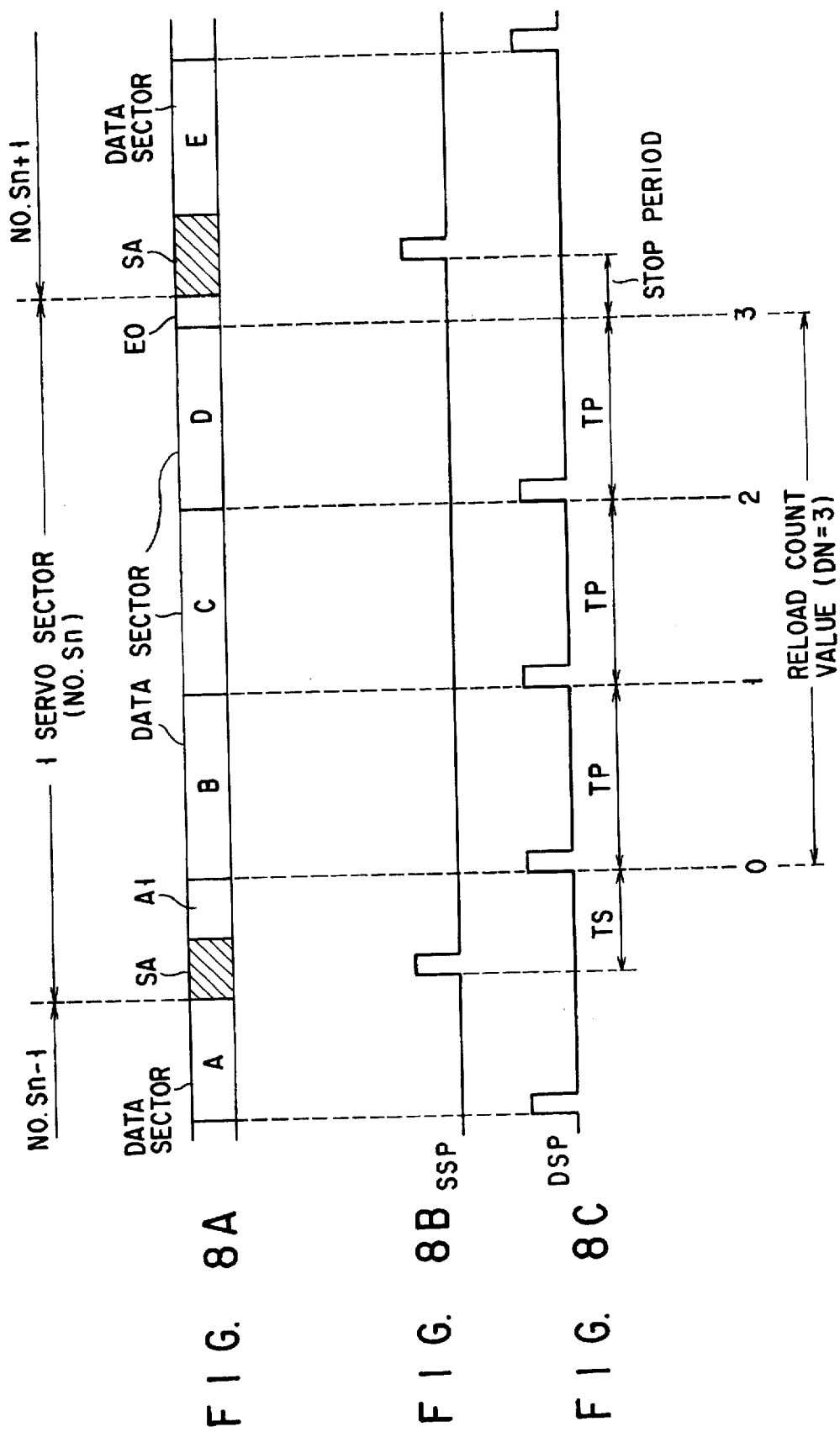
FIGS. 8A to 8C are timing charts for explaining the operation of the data sector pulse generator according to the present invention.

The initial value registers 50a and 51a are used to hold an initial parameter (TS) set in the counter 56 in an initializing operation. This parameter TS is time information (timer information) for providing a generation timing of a data sector pulse DSP corresponding to the first data sector DS in a servo sector following the servo sector identified by the servo sector number SN extracted by the servo circuit 18. That is, as shown in FIG. 8C, the parameter TS is information for setting the start position of the data sector pulse DSP of the first data sector (data sector B in this case) with reference to the position of the servo sector pulse SSP.

The reload registers 50b and 51b are used to hold a parameter TP set in the counter 56 again at the end of the initializing operation of the counter 56. This value TP is time information (timer information) for providing a repetition period of a data sector pulse. The reload count registers 50c and 51c are also used to set the contents of the reload registers 50b and 51b and hold a parameter (the number of data sectors in a servo sector) DN indicating the repetition count of the operation of the counter 56.

Figure 7:
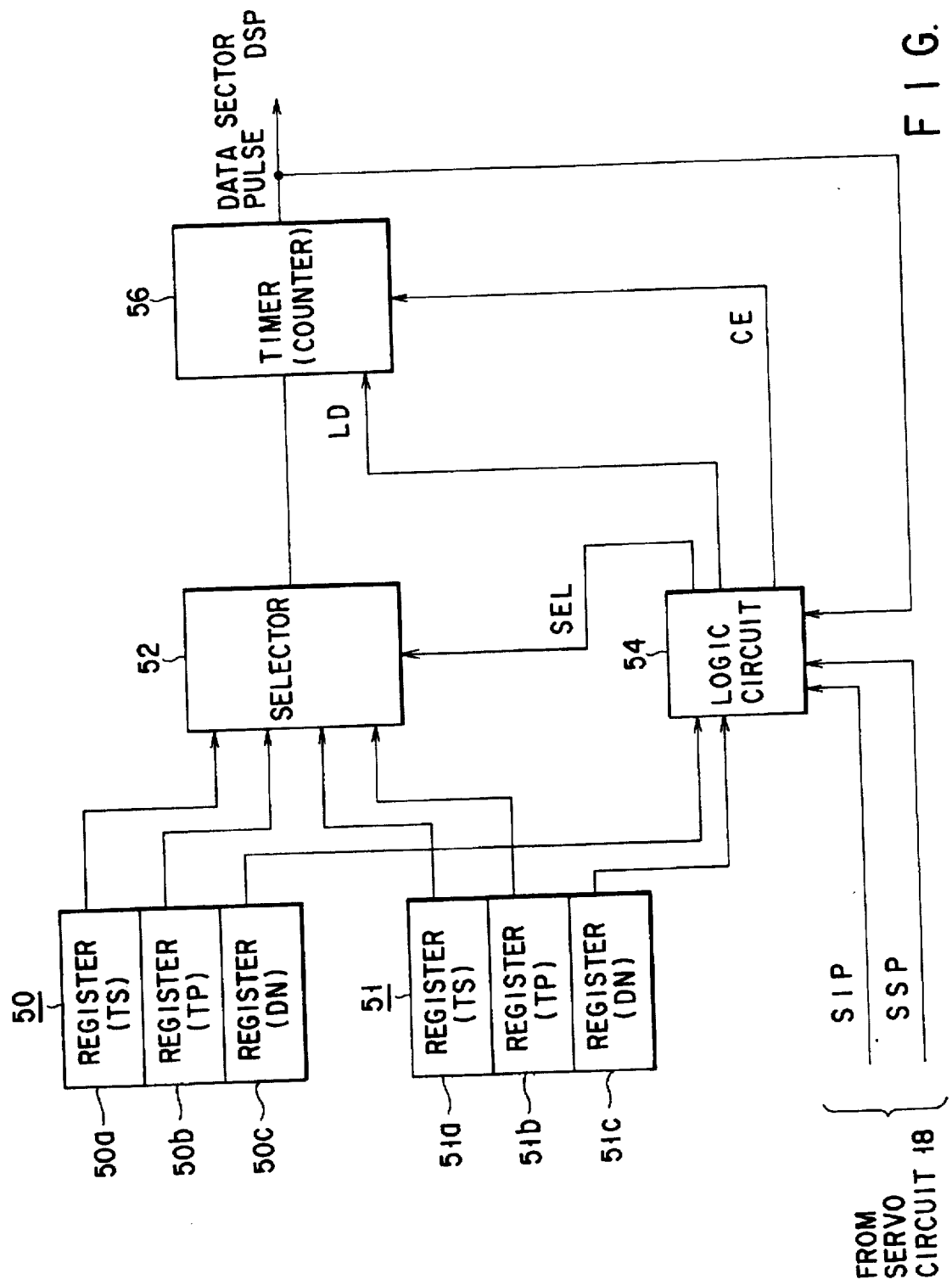
FIG. 7 is a block diagram showing a modification of the data sector pulse generator according to the present invention.

As shown in FIG. 7, the sector pulse generator 17 may use only the first sector 52 and omit the OR gate 55. The basic operation of this arrangement is the same as that shown in FIG. 5.

(Basic Operation of HDD)

In this embodiment, an HDD of the CRD scheme is assumed. In the CDR scheme, as shown in FIG. 27, the disk 2 is divided into a plurality of zones Z1 to Z6 in the radial direction, and several tens to several hundreds cylinders are included in each zone.

The servo area SA is radially recorded over the respective zones on the disk 2. Therefore, the servo area SA is not necessarily located at the start portion of each sector. More specifically, as shown in FIG. 8A, a format is assumed, in which a given servo sector based on the servo area SA includes a second half portion A1 of a data sector A, a plurality of data sectors B, C and D following the second half portion A1, and a first half portion E0 of a data sector E.

Assume that a read access request is generated by the host system 15 in the system shown in FIG. 1. In this case, the CPU 12 executes control for positioning the heads 1a and 1b to a target cylinder as an access target. In this case, the HDC 13 converts a logical address indicating the access target, supplied from the host system 15, into a physical address. The physical address is information consisting of a zone number, a cylinder address, a head number, and a sector number on the disk 2 and used to designate a data sector to be finally accessed.

As described above, the CPU 12 executes seek control for moving the heads 1a and 1b to a target cylinder (e.g., the track shown in FIG. 8A) on the basis of the cylinder address code recorded in the servo area SA. In addition, the CPU 12 executes track following control for positioning the heads 1a and 1b to the center of the target cylinder on the basis of the burst pattern recorded in the servo area SA.

The servo circuit 18 generates a servo sector pulse SSP or a servo index pulse SIP on the basis of a read signal from a sector/index pattern area SAd of the servo area SA. In response to the servo sector pulse SSP, the CPU 12 detects that the servo area SA is accessed by the heads 1a and 1b. In response to the servo index pulse SIP, the CPU 12 detects the reference point of a cylinder.

When the heads 1a and 1b are positioned to the target cylinder, the heads 1a and 1b read user data from a data sector in the target cylinder, and output the read signal to the read/write circuit 10. The read circuit of the read/write circuit 10 converts the read signal read by the heads 1a and 1b into read data of an NRZ code, and outputs the data to the HDC 13. The HDC 13 temporarily stores the data in the buffer memory 16 and transfers the read data to the host system 15 in units of sectors.

In contrast to the above operation, in response to a write access request from the host system 15, the write circuit of the read/write circuit 10 converts write data of an NRZ code transferred from the HDC 13 into a write signal (write current) and outputs the signal to the heads 1a and 1b. The heads 1a and 1b record the write data on the designated data sector of the target cylinder.

In a read/write access operation, in order to access a designated data sector for which an access request is generated, the ID information in an ID area must be referred to first to recognize the sector as the access target on the basis of the ID information. In order to reliably access an ID area at the start position of a data sector, the sector pulse generator 17 must be started to generate the data sector pulse DSP indicating the position of the ID area. The present invention is characterized in that the data sector pulse DSP is generated by using the servo sector number SN extracted by the servo circuit 18.

(Operation of Sector Pulse Generator 17)

The operation of the sector pulse generator 17 will be described below with reference to FIGS. 6 and 8A to 8C. As the sector pulse generator 17, the circuit shown in FIG. 7 having a simple arrangement is assumed.

Assume that the servo circuit 18 extracts/decodes the servo sector code (servo sector number SN) recorded in the area SAj of the servo area SA (step S1 in FIG. 6) by using a decoder circuit having the same arrangement as that of a decoder circuit for decoding (reproducing) a cylinder address code. In this case, the servo circuit 18 outputs an interrupt to the CPU 12.

Figure 6:
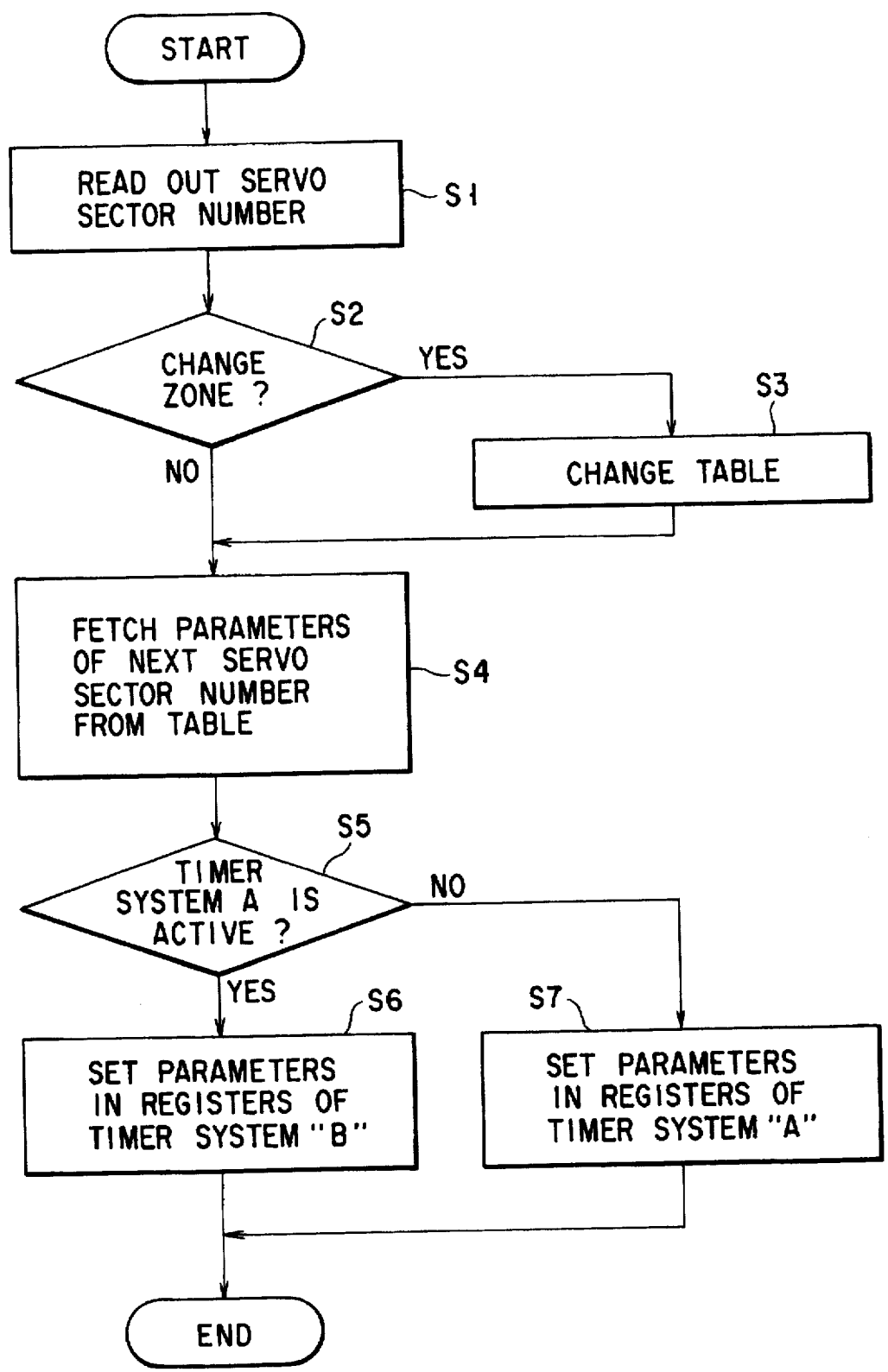
FIG. 6 is a flow chart for explaining the operation of the data sector pulse generator according to the present invention.

The CPU 12 executes processing (setup processing) corresponding to steps S2 to S7 in FIG. 6 to generate the data sector pulse DSP every time the servo sector number SN is decoded by the servo circuit 18 and the servo circuit 18 generates an interrupt.

The CPU 12 determines three types of parameters (TS, TP, and DN) to be set in the first or second register group 50 or 51 of the sector pulse generator 17 by referring to a table stored in the ROM 14 (step S6 or S7).

A table is basically arranged for each zone and is designated by a base address determined by a zone number indicating a zone as an access target. The locations of parameters in a table for each zone are designated on the basis of the servo sector number SN (a servo sector number× the data lengths of three types of parameters).

In this embodiment, the parameters (timing information) stored at the locations, in the table, designated by the servo sector number SN are the parameters TS, TP, and DN (for generating a data sector pulse) in a servo sector indicated by a servo sector number following the current servo sector number.

When the zone number of the access target is changed from that in the preceding access operation, the CPU 12 changes the table to be referred to by changing the base address (YES in step S2; step S3).

More specifically, the above tables include table A shown in FIG. 4A and table B shown in FIG. 4B. Table A is prepared for each zone.

The CPU 12 selects table A corresponding to the zone number of an access target, and fetches three types of parameters TS, TP, and DN from a reference position, in the table, determined by the current servo sector number (step S4).

In this embodiment, the following two modes are prepared: mode A in which the counter 56 in the sector pulse generator 17 shown in FIG. 7 operates in accordance with parameters set in the first register group 50; and mode B in which the counter 56 operates in accordance with parameters set in the second register group 51. Therefore, timers of two apparent systems operate. For the sake of convenience, the system constituted by the first register group 50 and the counter 56 is referred to as timer system "A", and the system constituted by the second register group 51 and the counter 56 is referred to as timer system "B". Timer system "A" and timer system "B" do not operate at once. While one system is in operation, the other system prepares for the generation of the next data sector pulse.

Assume that timer system "A" is performing an operation of generating a data sector pulse in accordance with the parameters TS, TP, and DN in a servo sector corresponding to a servo sector number Sn-1, as shown in FIG. 8A. In this case, the CPU 12 sets the parameters TS, TP, and DN corresponding to the next servo sector number Sn, fetched from the table in step S4, in the registers 51a, 51b, and 51c constituting the register group 51 of timer system "B" (steps S5 and S6).

When the operation of timer system "A" is completed, timer system "B" starts to operate in accordance with the parameters TS, TP, and DN set in the register group 51, thereby generating the data sector pulse DSP. In this case, timer system "B" starts to operate with reference to the servo sector pulse SSP (or servo index pulse SIP) generated by the servo circuit 18 on the basis of the sector/index area SAd recorded on the servo area SA of a servo sector corresponding to a servo sector number Sn.

During this period, the CPU 12 sets the parameters TS, TP, and DN for generating a data sector pulse corresponding to a next servo sector number Sn+1 in the register group 50 of timer system "A".

In contrast to the above operation, assume that timer system "B" is performing an operation of generating a data sector pulse corresponding to the servo sector number Sn-1 (i.e., timer system "A" is not in operation). In this case, the CPU 12 sets the parameters TS, TP, and DN for generating a data pulse corresponding to the servo sector number Sn, fetched from the table in step S4, in the registers 50a, 50b, and 50c constituting the register group 50 of timer system "A" (steps S5 and S7).

When the operation of timer system "B" is completed, timer system "A" starts to operate in accordance with the parameters TS, TP, and DN set in the register group 50, thereby generating the data sector pulse DSP. During this period, the CPU 12 sets the parameters TS, TP, and DN for generating a data sector pulse corresponding to the next servo sector number Sn+1 in the register group 51 of timer system "B".

The operation of the sector pulse generator 17 will be described in detail next. In this case, while an operation of generating the data sector pulse DSP corresponding to the servo sector number Sn-1 is being performed, the parameters TS, TP, and DN for the next servo sector number Sn, fetched from the table on the basis of the servo sector number Sn-1, are set in the register group 50 of timer system "A". This operation will be described below.

As shown in FIG. 7, when the servo sector pulse SSP (servo index pulse SIP) is generated by the servo circuit 18, the logic circuit 54 switches from timer system "B" in operation to timer system "A" in the following manner. The logic circuit 54 outputs a selection signal SEL for selecting the initial value register 50a in the first register group 50 to cause the sector 52 to select the parameter TS set in the initial value register 50a, and loads the parameter in the counter 56 in response to a load signal LD.

The logic circuit 54 outputs a count enable signal CE to the counter 56 to start the counter 56 in synchronism with the servo sector pulse SSP. With this operation, the counter 56 starts a timer operation (count operation) on the basis of the parameter TS loaded in the counter 56 via the selector 52. With this operation, as shown in FIG. 8C, the counter 56 generates the data sector pulse DSP at the timing a period TS after the generation of the servo sector pulse SSP (the timing at which counting of TS is completed). Owing to the value of the parameter TS fetched in accordance with the servo sector number Sn-1, this timing corresponds to the position of the ID area of the data sector B at the head of the servo sector corresponding to the next servo sector number Sn.

When the first data sector pulse DSP is generated by the counter 56, the logic circuit 54 loads the parameter TP, set in the reload register 50b, in the counter 56 to restart the counter 56 as in the case wherein the parameter is loaded. The counter 56 then starts a timer operation (count operation) on the basis of the parameter TP. With this operation, as shown in FIG. 8C, the counter 56 generates the second data sector pulse DSP at the timing a period TP after the generation of the first data sector pulse DSP (the timing at which counting of TP is completed). This timing corresponds to the position of the ID area of a data sector C in a servo sector corresponding to the next servo sector number Sn.

Subsequently, the counter 56 repeats the timer operation (count operation) based on the parameter TP stored in the reload register 50b to generate the third and fourth data sector pulses DSP at the period TP in the same manner as described above. The timings of the third and fourth data sector pulses DSP correspond to the positions of the ID areas of data sectors D and E in the servo sector corresponding to the servo sector number Sn. The number of times of repetition of the timer operation based on the parameter TP is determined by the parameter DN set in the reload count register 50c.

During such an operation of timer system "A", the CPU 12 is executing setup processing with respect to timer system "B" to prepare for generation of the next data sector pulse (step S6 in FIG. 6). That is, the CPU 12 executes processing of setting the parameters TS, TP, and DN for the generation of a data sector pulse corresponding to the next servo sector number Sn+1 in the registers 51a, 51b, and 51c in the second register group 51.

As described above, in this embodiment, a servo sector number (servo sector code) for identifying each servo sector is recorded in each servo area SA. The CPU 12 controls the sector pulse generator 17 to generate the data sector pulse DSP at a designated position conforming to the format of a data sector included in a servo sector (the next servo sector in practice) designated on the basis of a servo sector number.

The sector pulse generator 17, therefore, generates the data sector pulse DSP at the timing corresponding to the position of the ID area of the data sector included in the servo sector corresponding to the servo sector number. In response to this data sector pulse DSP, the CPU 12 reads ID information from the ID area of each data sector and determines whether the corresponding data sector is an access target.

In other words, the scheme of the present invention is a scheme of obtaining the position of the ID area of each data sector from the position of the physical servo area on the disk 2. Even if, therefore, the servo sector pulses SSP are not consecutively generated, the position of the ID area of each data sector can be reliably detected. Although the area SAj for recording a servo sector number is required, this area need not be as large as an area for recording an address mark in the conventional scheme. For this reason, a reduction in data recording area does not occur. In addition, even if a head switching operation is executed while the location of servo data on the upper surface of the disk 2 does not coincide with that of servo data on the lower surface, the position of the ID area of each data sector can be reliably detected.

In addition, since the HDC 13 has a table for causing a sector number indicating an access target to correspond to the servo sector number SN, ID information such as a sector number for identifying each data sector D can be omitted. The HDC 13 can detect a target data sector on the basis of the reproduced servo sector number SN and the data sector pulse DSP. Note that, sector format information (e.g., shown in FIG. 8A) based on the CDR scheme is stored in the HDC 13 in advance. This sector format information is information indicating the arrangement of data sector included in a servo sector with reference to the servo area SA. The information also includes split information for identifying data sectors (the data sectors A to E in FIG. 5) divided from a servo sector. (Defect Processing of Data Sector)

FIGS. 9, 10A to 10C, and 11A and 11B show an embodiment associated with defect processing in which when a defect is present in a data sector, the sector pulse generator (see FIG. 5 or 7) of the present invention is used.
(Arrangement of Circuit)

As shown in FIG. 9, a circuit for executing defect processing in this embodiment is obtained by adding first and second pulse number registers 57a and 57b and a logic circuit 58 to the sector pulse generator 17 shown in, e.g., FIG. 5. The logic circuit 58 serves to remove a pulse corresponding to a defect sector from the data sector pulse DSP output from the counter 56 of the sector pulse generator 17. The first and second pulse number registers 57a and 57b serve to hold data for designating the data sector pulse DSP corresponding to the defect sector.

The logic circuit 58 recognizes which one of timer system "A" and timer system "B" is in operation, on the basis of output signals S1 and S2 from the selectors 52 and 53 of the sector pulse generator 17. Timer system "A" and timer system "B" are set for the sake of convenience, as described above. The logic circuit 58 counts the number of times the data sector pulse DSP is output from the counter 56 of timer system "A" or timer system "B" in synchronism with the servo sector pulse SSP or the servo index pulse SIP.

The pulse number of the data sector pulse DSP corresponding to a defect sector is set in the first and second pulse number registers 57a and 57b. The CPU 12 sets the corresponding pulse number (to be described later) in the first and second pulse number registers 57a and 57b on the basis of defect information from the HDC 13.
(Conventional Defect Processing Scheme)

A conventional defect processing scheme will be described below with reference to FIGS. 11A and 11B.

Assume that a defect sector 90 (a data sector corresponding to sector number 10) is present in a track on the disk 2, as shown in FIG. 11A. In the conventional defect processing scheme, a spare sector 91 is used as a substitute for the defect sector 90. In general, the spare sector 91 corresponding to a 1-data sector is prepared per track.

In this defect processing scheme, as shown in FIG. 11B, the sector number (10) recorded on the ID area of the defect sector 90 is rewritten into a sector number (X in this case) which does not exist actually, and sector number 10 is moved to a sector 92 corresponding to sector number 11. Thereafter, sector numbers are sequentially moved up to the spare sector 91 (skip processing). With such skip processing, since the sector number X of the defect sector 90 does not coincide with the sector number of an access target, access to the defect sector 90 can be inhibited.

In such a conventional defect processing scheme, if there is a defect in the ID area of the defect sector 90, rewrite processing of the sector number X cannot be performed, and the above skip processing cannot be performed. In addition, in the sector arrangement in which ID areas are omitted to increase the recording density, since comparison between sector numbers, which is performed to identify the defect sector 90, cannot be performed, the above skip processing cannot be performed.

According to the present invention, therefore, a circuit like the one Shown in FIG. 9 is used to prevent generation of the data sector pulse DSP at a sector position corresponding a defect sector to allow skip processing of skipping the defect sector without comparing sector numbers.
(Defect Processing Scheme of Present Invention)

The defect processing scheme of the present invention will be described below with reference to FIGS. 9 and 10A to 10C.

Assume that a servo sector SA1 on a given track consists of data sectors A to D (the sector D is a divided portion), and a data sector B is a defect sector 90 in this sector format.

The HDC 13 pre-stores defect information designating the defect sector 90 and the use of a spare sector 91 as a substitute for the defect sector 90. The CPU 12 sets a pulse for preventing the generation of the data sector pulse DSP at the position of the defect sector 90 (data sector B) in the first or second pulse number register 57a or 57b.

In this case, the first and second pulse number registers 57a and 57b correspond to timer system "A" and timer system "B". As described above, timer system "A" and timer system "B" do not operate at once. While one timer system is in operation, the other timer system is set in a standby state for the generation of the next data sector pulse. Note that both timer system "A" and timer system "B" prepare for the generation of the data sector pulse DSP for a servo sector corresponding to the next servo sector number in response to a servo sector number reproduced by the heads.

For the sake of convenience, assume that the CPU 12 sets a pulse number ("2" in this case) corresponding to the defect sector 90 (sector B) in the first pulse number register 57a corresponding to timer system "A".

As shown in FIG. 10C, the counter 56 of timer system "A" outputs data sector pulses DSP1 to DSP4 at the timings corresponding to the start positions of the data sectors A to D with reference to the generation of the servo sector pulse SSP.

The logic circuit 58 counts the data sector pulses DSP1 to DSP4 from the counter 56 in synchronism with input of the servo sector pulse SSP (or the servo index pulse SIP), and subtracts the contents ("2") of the first pulse number register 57a in accordance with the count value. In this case, the logic circuit 58 checks whether the contents of the first pulse number register 57a after the substraction are "0"

More specifically, when the first data sector pulse DSP1 is output, the contents of the first pulse number register 57a become "2−1=1". Since the contents of the first pulse number register 57a are not "0", the logic circuit 58 outputs the data sector pulse DSP1 as the effective data sector pulse DSP. When a next data pulse DSP2 is output, the contents of the first pulse number register 57a become "1−1=0". As a result, the logic circuit 58 recognizes that the data sector pulse DSP2 is an ineffective data sector pulse corresponding to the defect sector, and inhibits an output operation.

As shown in FIG. 10C, therefore, the data sector pulse DSP2 corresponding to the data sector B is not generated. When the contents of the first pulse number register 57a become "0" again, the logic circuit 58 outputs subsequently input data sector pulses DSP3 and DSP4 as the effective data pulses DSP.

In this manner, when a target data sector is to be accessed by the heads, generation of the effective data sector pulse DSP2 is inhibited at the position of the defect sector 90 designated by the defect information. Therefore, the data sector B as the defect sector 90 is not detected. That is, the defect sector is skipped. At the positions of data sectors (C and D) other than the defect sector 90, the effective data sector pulses DSP3 and DSP4 are output, thereby allowing consecutive access to the data sectors C and D after the data sector A.

According to this scheme of the present invention, rewrite processing of a sector number (X) which does not exist in the ID area of the defect sector 90 need not be performed. Therefore, even if a defect is present in an ID area, skip processing of skipping a defect sector can be performed. In addition, in the sector arrangement in which ID areas are omitted, skip processing of skipping a defect sector can be realized in the same manner as described above.

(Access Scheme for Data Sector from Which ID Area Is Omitted)

FIGS. 12 to 16 show an embodiment associated with a scheme of generating the data sector pulse DSP for accessing a data sector having no ID area by using a servo sector format having a servo sector number according to the present invention.

As shown in FIG. 1.2, according to the format of a data sector from which an ID area is omitted, ID information other than a PLL SYNC area DSa and a SYNC byte area DSb is omitted (see FIG. 28). The PLL SYNC area DSa is an area used to establish synchronization with a data discrimination window before ID information is read. In this area, a synchronization pattern having a predetermined frequency is recorded. In the SYNC byte area DSb, information for establishing synchronization to demodulate an NRZ (non return zero) code signal is recorded for each byte. The NRZ code signal is input upon establishment of synchronization by the PLL SYNC area DSa.

With such a sector format from which ID information is omitted, the recording density of the disk 2 can be increased. However, since ID information such as a sector number is not present, it cannot be checked, on the basis of ID information reproduced by the heads, whether a given sector is a target sector to be accessed. For this reason, the present invention employs a scheme of determining the position of a target sector on the basis of a servo sector number recorded on the servo area SA and accessing the target sector by generating a reference pulse PS corresponding to the determined position.

(Arrangement of Reference Pulse Generator)

This embodiment uses a circuit for generating the reference pulse PS for accessing a target data sector, as shown in FIG. 13. This circuit is constituted by a register 60 and a counter 61. The register 60 stores pulse number data corresponding to a target data sector, i.e., a count value to be counted by the counter 61. A pulse number to be stored is calculated by the CPU 12 and set in the register 60.

The counter 61 is started in response to a start signal from the CPU 12, and starts a count operation for the data sector pulses DSP in synchronism with input of the servo sector pulse SSP. Upon counting the data sector pulses DSP by the pulse number data set in the register 60, the counter 61 outputs one reference pulse PS to the HDC 13. Note that the data sector pulse DSP is output from the sector pulse generator 17 (see FIG. 5 or 7).

(Access Operation for Target Data Sector)

This embodiment is based on the assumption that data for obtaining location information of a target data sector on the basis of the sector number of the target data sector is stored in the ROM 14 in advance. The sector number of a target data sector is obtained, by the HDC 13, as part of a physical address converted from a logical address from the host system 15.

The location information of a target data sector is a location address indicating the ordinal number of a target data sector in the sector format of a servo sector (identified by a servo sector number) in which the target data sector is present. Therefore, a table constituted by servo sector numbers corresponding to sector numbers and location addresses is stored in the ROM 14.

When an access operation is started, the CPU 12 obtains the location information of a target data sector to be accessed by referring to the table stored in the ROM 14. In addition, the CPU 12 calculates pulse number data corresponding to the location address from the location information of the target data sector and sets the data in the register 60 (step S10 in FIG. 16). Assume, in this case, that a target data sector TDS is a second data sector DS(2) located next to a first data sector DS(1) in a servo sector of a servo sector number SA1, as shown in 15.

The CPU 12 controls the servo mechanism to perform control for positioning the heads to a target cylinder in which a target data sector TS is present. The CPU 12 detects the servo sector (servo sector number SA1), in which the target data sector is present, on the basis of a servo sector number (see FIG. 2B) reproduced by the heads (step S11). Upon detecting the target servo sector number SA1, the CPU 12 outputs a start signal to the counter 61 to set the counter 61 in an operative state (step S12).

In practice, the CPU 12 prepares for output of a start signal when detecting a servo sector number SA0 immediately preceding the target servo sector number SA1. In addition, the HDC 13 prepares for execution of, e.g., a read operation with respect to the target data section in synchronism with the reference pulse PS output from the reference pulse generator.

The counter 61 starts to count the data sector pulses DSP in synchronism with the servo sector pulse SSP corresponding to the target servo sector number SA1 (step S13). That is, as shown in FIGS. 14A and 14B, the counter 61 sequentially counts the data sector pulses DSP1 to DSP3 corresponding to the servo sector number SA1 in synchronism with the servo sector pulse SSP. When the counter 61 counts the data sector pulses DSP by the pulse number data ("2" in this case) set in the register 60, the counter 61 outputs one reference pulse PS (PS1) to the HDC 13 (steps S14 and S15).

Figure 15:
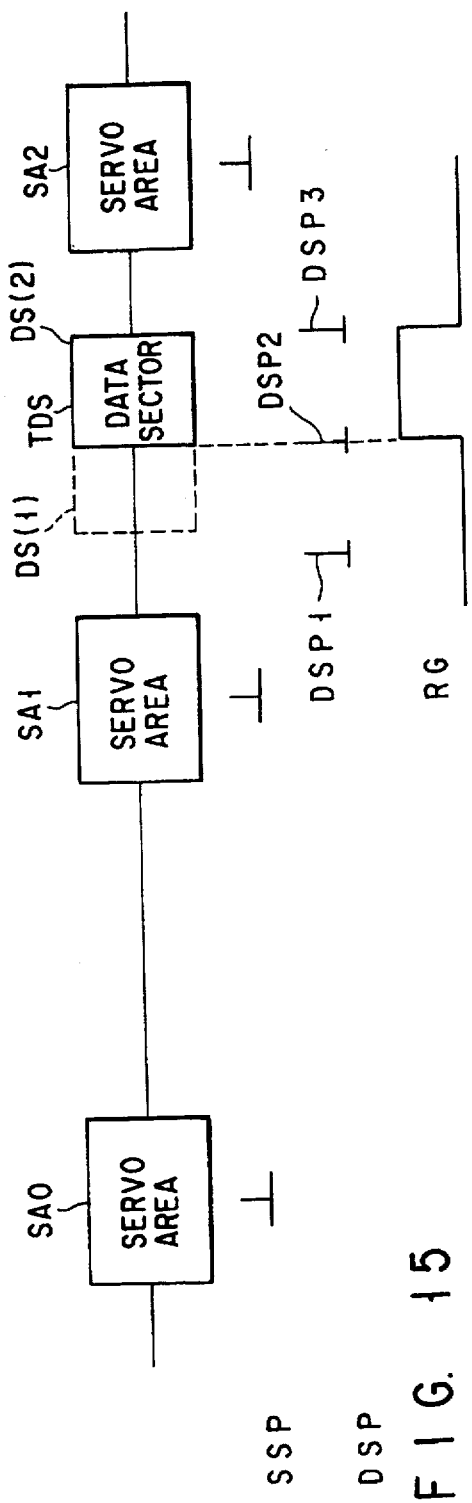
FIG. 15 is timing charts for explaining the operation of an access scheme for a data sector from which an ID area is omitted in the present invention.

As shown in FIG. 15, in response to the reference pulse PS, the HDC 13 outputs a read gate RG and executes a read operation with respect to the target data sector. That is, the HDC 13 receives read data output from the read/write circuit 10 as data from the target data sector at the timing of the read gate RG. When a write operation of writing data in the target data sector is to be executed, the HDC 13 outputs a write gate in response to the reference pulse PS.

When a plurality of target data sectors are to be consecutively accessed, since the next target data sectors are consecutively arranged after the first target data sector, the counter 61 outputs the data sector pulse DSP, as a reference pulse, to the HDC 13. That is, as shown in FIG. 14C, upon outputting the first reference pulse PS1, the counter 61 directly outputs the data sector pulse DSP3 as a reference pulse PS2 corresponding to the next target data sector.

As described above, in the format of a data sector from which ID information is omitted, a read/write operation can be executed upon detecting a target data sector without reading a sector number through the heads.

(Track Skew System)

FIGS. 17 to 20 show an embodiment associated with a track skew system for minimizing the rotation wait time of the disk 2 which occurs owing to the influences of the seek time of the heads and head switching time in accessing a target data sector.

A track skew system for an HDD is known, in which in consecutively accessing target data sectors, the start data sectors of tracks are delayed (skewed) in units of sectors, especially in consideration of the seek time of the heads. This track skew system uses a sector format obtained by calculating a sector count corresponding to the seek time and delaying the position of a start data sector from a reference signal (servo index pulse SIP) by the sector count.

According to the present invention, servo numbers are sequentially recorded on the respective servo areas of each track. In addition, as shown in FIG. 17, identical servo sector numbers are recorded at identical positions on the tracks (0 to 2) in the radial direction (the seek direction of the heads) of the disk 2.

When the track skew system is applied to such a sector format in the present invention, a system for delaying the positions of sectors in units of servo sector numbers is employed. The track skew system of the present invention will be described in detail below.

Figure 17:
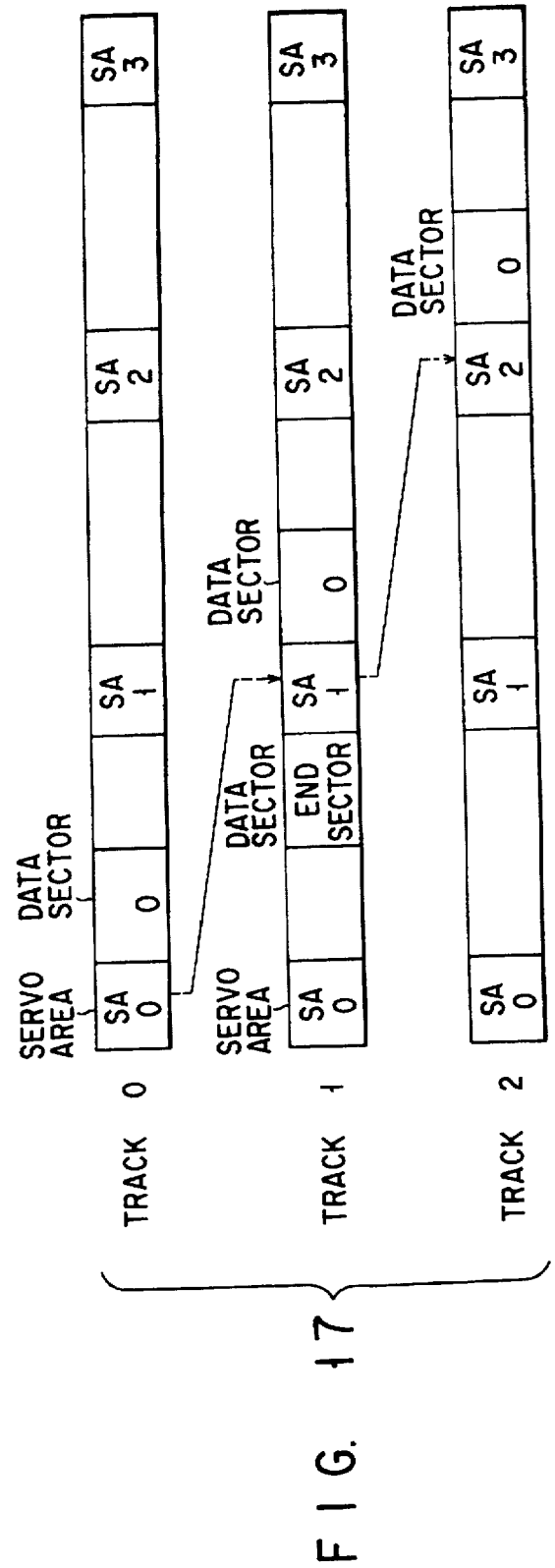
FIG. 17 is a view for explaining a track skew system according to the present invention.

As shown in FIG. 17, in track 1 adjacent to track 0, data sector 0 corresponding to servo sector number 1 is the start data sector, and the last data sector corresponding to servo sector number 0 is the last sector of track 1. In addition, track skew processing is performed such that data sector 0 corresponding to data sector number 2 becomes the first data sector of track 2.

Assume that the heads seek from track 1 to track 2 to read-access a data sector. In this case, when the heads complete the read-access to the last sector of track 1, a seek operation is started to move the heads to track 2.

Figure 19:
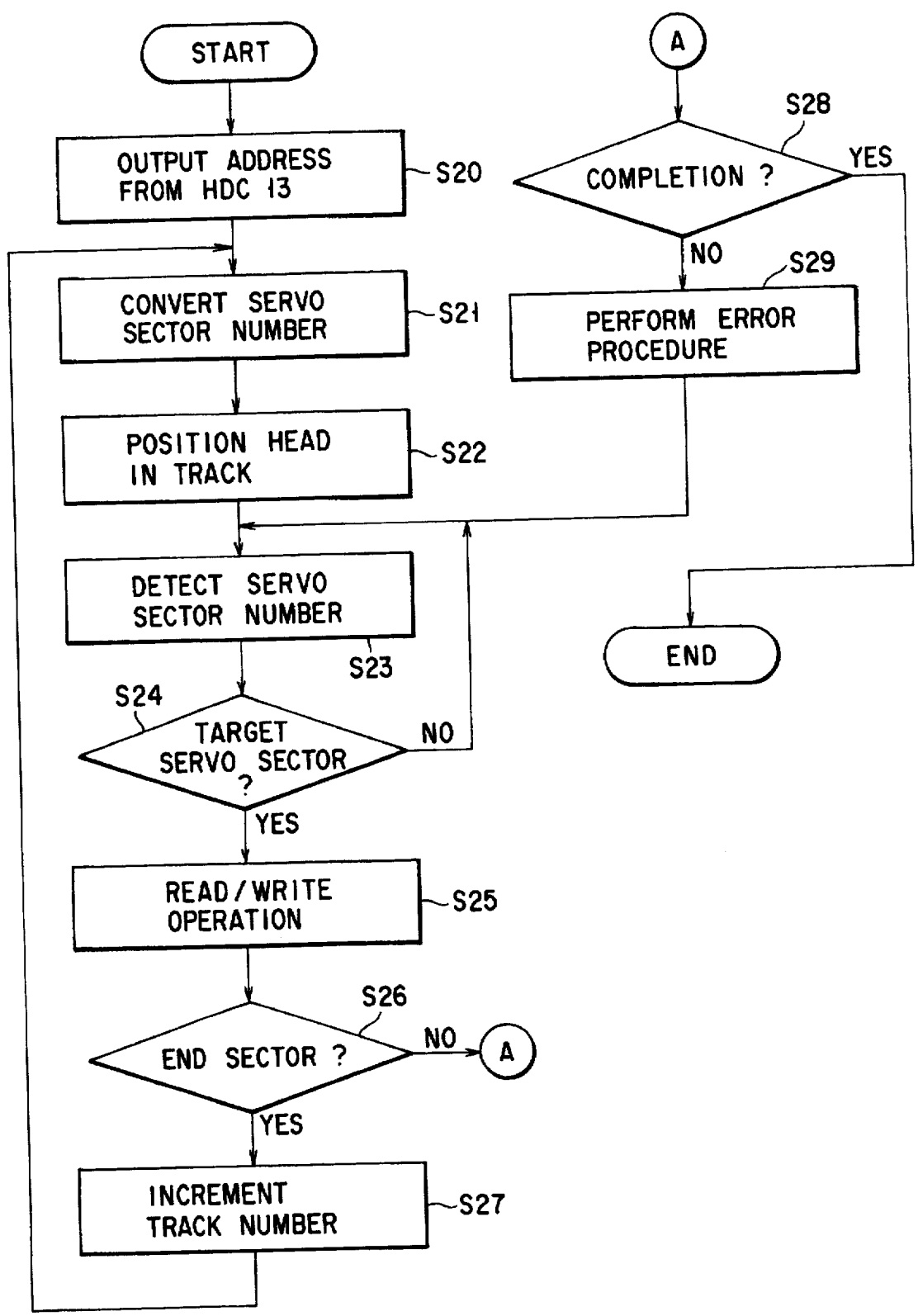
FIG. 19 is a flow chart for explaining the operation of the track skew system according to the present invention.

More specifically, as indicated by step S20 in FIG. 19, when a target address of an access target is output to the HDC 13, the CPU 12 executes control for positioning the heads to track 2 as a target track (step S22). A target address is a physical address consisting of a track (cylinder) number, a sector number, a head number, and a servo sector number.

In this case, as shown in FIG. 17, in order to minimize the rotation wait time of the disk 2, track skew processing is performed in the sector format of track (2) with respect to track 1 on the basis of relationship between the seek time of the heads and the rotational speed of the disk 2.

More specifically, the sector format is set such that access is consecutively performed from the last data sector of track 1 to the first data sector (sector 0) of track 2. Therefore, in order to access the start data sector of track 2, the HDC 13 calculates a servo sector number ("2" in this case) in consideration of the rotation wait time of the disk 2, and converts the target servo sector number (step S21).

When target servo sector number 2 is detected by the heads positioned at track 2, the HDC 13 execute a read operation of reading out data from the target sector (start data sector 0) (steps S23, S24, and S25). When the last data sector of track 2 is accessed, the target track number is incremented to access the next target track (steps S26 and S27). In this case, if access to the last data sector is not completed before a predetermined period of time (corresponding to the rotation time of the disk 2) elapses, it is determined that an error has occurred, and a predetermined error procedure is executed (NO in step S26; steps S28 and S29).

In this manner, the track skew system can be applied to the present invention by using the sector format in which positioning of sectors is delayed in units of servo sector numbers. In the above system, however, since identical servo sector numbers are recorded at identical positions on the tracks in the radial direction, the servo sector numbers at which the start data-sectors of the respective tracks are located are different from each other. For this reason, every time a seek operation is performed, servo sector number conversion processing is required to obtain a target servo sector number (step S21). If the time for this conversion processing is long, the access time for a target data sector is adversely influenced.

(Modification of Track Skew System)

A modification which allows omission of the above servo sector number conversion processing will be described below with reference to FIGS. 18 and 20.

Figure 18:
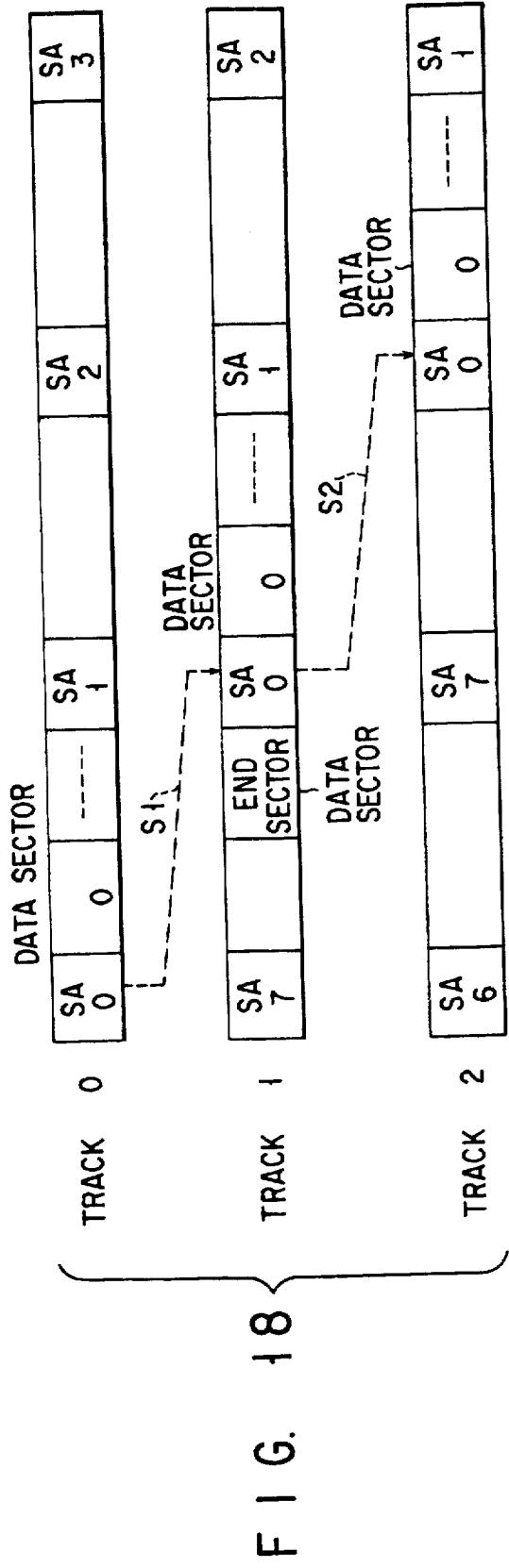
FIG. 18 is a view for explaining a modification of the track skew system according to the present invention.
Figure 22:
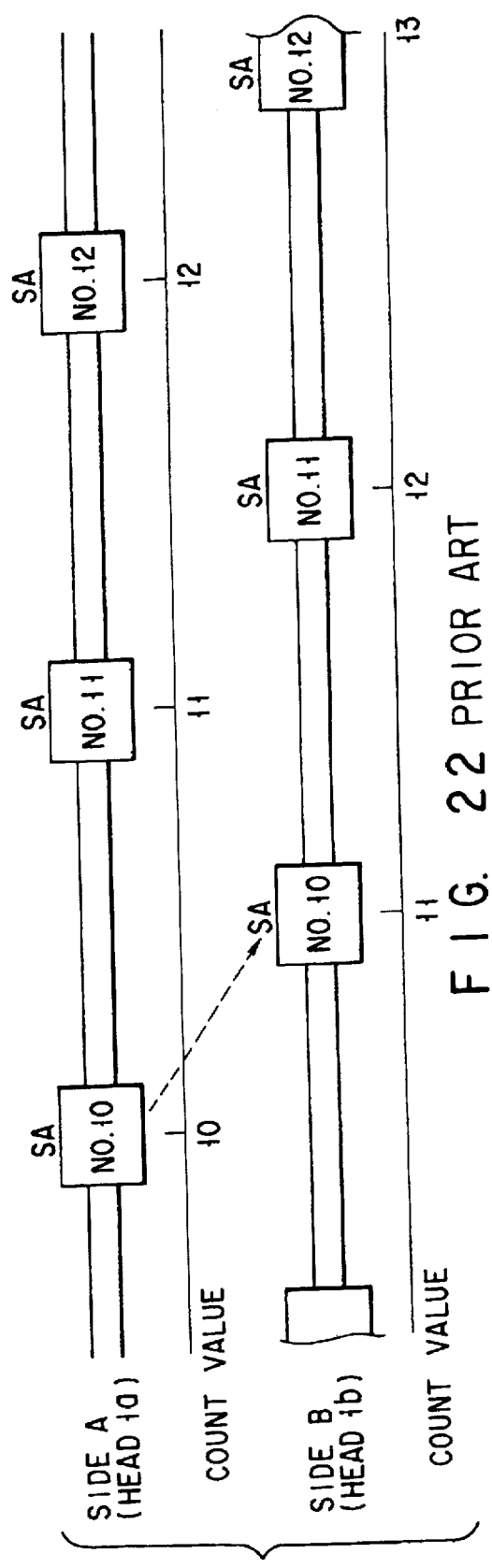
FIG. 22 is a View for explaining a conventional head switching operation.

In this modification, as shown in FIG. 18, identical servo sector numbers are recorded at identical positions, in consecutive tracks 0, 1, and 2, set in consideration of the time for track change processing as steps (steps S1 and S2) in which the heads move to an adjacent track.

In the sector format in this modification, track 10 skew processing is performed on the basis of the seek time of the heads and the rotational speed of the disk 2 to minimize the rotation wait time of the disk 2, as in the sector format shown in FIG. 17.

Similar to the above case, assume that the heads seek from track 1 to track 2 to consecutively perform data read operations in this sector format.

When the heads complete access to the last data sector of track 1, a seek operation is started to move the heads to track 2.

As indicated in step S30 of FIG. 20, when the target address of an access target is output from the HDC 13, the CPU 12 executes control for positioning the heads to a track 2 as a target track (step S31).

In this case, in order to minimize the rotation wait time of the disk 2, track skew processing is performed in the sector format of track 2 with respect to track 1 on the basis of relationship between the seek time of the heads and the rotational speed of the disk 2, as shown in FIG. 18. More specifically, the sector format is set such that access is consecutively performed from the last data sector of track 1 to the first data sector (sector number 0) of track 2.

In order to access the start data sector (sector number 0) of track 2, servo sector number 0 is detected by the heads positioned at track 2 (step S32). In this case, since servo sector number 0 of track 2 is recorded at a position set in consideration of track skew processing, as shown in FIG. 18, the servo sector number is detected by the heads without requiring the rotation time of the disk 2.

In other words, since the servo sector numbers ("0" in this case) at which the start data sectors of the respective tracks are located are the same, there is no need to perform servo sector number conversion processing to obtain a target servo sector number every time a head seek operation is performed.

When target servo sector number 0 is detected, the HDC 13 executes a read operation of reading out data from the target data sector (start data sector 0) (steps S33 and S34). When the access operation is completed up to the last data sector of track 2, the target track number is incremented to access the next target track (steps S35 and S36). In this case, if access to the last data sector is not completed until a predetermined period of time (corresponding to the rotation time of the disk 2) elapses, it is determined that an error has occurred, and a predetermined error procedure is executed (NO in step S35; steps S37 and S38).

In this manner, a track skew system can be realized without requiring servo sector number conversion processing by using a sector format in which the positioning of sectors is delayed in units of servo sector numbers in consideration of track skew processing and also setting the recording positions of servo sector numbers in consideration of track skew processing. Since the time for servo sector number conversion processing in the above embodiment is not required, the access time for a target data sector can be shortened.

(System for Inferring Servo Sector Number)

As described above, in the present invention, the data sector pulse DSP is generated by extracting a servo sector number from the servo area SA of the disk 2. In this case, if a decoding error occurs when the servo circuit 18 decodes (reproduces) the servo sector number, processing of generating the data sector pulse DSP cannot be properly executed.

This embodiment, therefore, is associated with an inference system for inferring a correct servo sector number when a decoding error (extraction error) has occurred in decoding a servo sector number.

This embodiment will be described below with reference to the flow chart shown in FIG. 21.

As described above, first of all, the servo circuit 18 extracts/decodes the servo sector number recorded in the servo area SA by using a decoder circuit having the same arrangement as that of a decoder circuit for decoding (reproducing) a cylinder address code. The servo circuit 18 then outputs an interrupt to the CPU 12.

Every time a servo sector number is decoded by the servo circuit 18 and an interrupt is generated, the CPU 12 generates the data sector pulse DSP at the timing corresponding to the start position (the position of the ID area) of each data sector of a servo sector designated by the decoded servo sector number. In practice, each data sector corresponds to each data sector starting from the ID area in a servo sector following the servo sector indicated by the decoded servo sector number.

The CPU 12 executes the processing shown in FIG. 21 on the basis of the above premise. First of all, the CPU 12 checks whether a seek operation is being performed (step S41). If YES in step S41, the CPU 12 determines that no data sector pulse is required, and sets a preset value n3, as a software counter (variable), in an error counter EC (Error Counter) (step S43), and performs no processing associated with generation of a data sector pulse (step S43). With this operation, the load on the CPU 12 is reduced. Note that preset values applied to the present invention include n1 and n2, in addition to n3, and the relationship between these preset values is set as follows: n1<n2<n3.

If NO in step S41, the CPU 12 determines that a data sector pulse is required, and performs corresponding processing as follows.

First of all, the CPU 12 loads the servo sector number decoded by the servo circuit 18 from the servo circuit 18 and sets the servo sector number in a variable CSN (Current Sector Number) indicating the current servo sector number (step S44).

Subsequently, the CPU 12 checks whether the value of the error counter EC is larger than the preset value n1 (step S45). If this step is performed immediately after a seek operation is completed, the preset value n3 (n3>n1) is set in the error counter EC (step S42). In this case, therefore, the CPU 12 determines that the value of the error counter EC is larger than the preset value n1.

In this case, the CPU 12 checks whether a decoding error has occurred in the servo sector number decoded by the servo circuit 18 (step S46). In general, the servo circuit 18 decodes the servo sector number recorded on the servo area SA by two methods to obtain two servo sector numbers. If the two obtained servo sector numbers do not coincide with each other, it is determined that a decoding error has occurred in the servo sector number. Note that since various conventional decoding methods are known, and are not directly associated with the present invention, a description thereof will be omitted.

If a decoding error has occurred, the CPU 12 sets the preset value n3 in the error counter EC (step S42), as in the case wherein the seek operation is being performed, and performs no processing associated with the generation of a data sector pulse (step S43).

If no decoding error has occurred, the CPU 12 decrements the contents of the error counter EC by one, and sets the current servo sector number, indicated by the variable CSN, in a variable PSN (Previous Sector Number) indicating the immediately preceding servo sector number (steps S47 and S48). The CPU 12 performs no processing associated with the generation of a data sector pulse (step S43).

If the processing in step S41 and steps S44 to S48 is consecutively repeated (n3−n1) times, i.e., a correct servo sector number is consecutively decoded (n3−n1) times after the seek operation is completed, the value of the error counter EC becomes n3−(n3−n1)=n1. If, therefore, a servo sector number is decoded next, NO (EC≦n1) is obtained in step S45. In this case, the CPU 12 proceeds to processing of generating a data sector pulse, as will be described later.

In contrast to this, if a decoding error is detected in the servo sector number in step S46 before the processing in step S41 and steps S44 to S48 is consecutively repeated (n3−n1) times, the error counter EC-is set to n3 again (step S42). Therefore, the flow advances from step S45 to step S46 until a correct servo sector number is consecutively decoded (n3−n1) times.

If a correct servo sector number is consecutively decoded (n3−n1) times after the seek operation, the CPU 12 determines NO (EC≦n1) in step S45, and the flow advances to step S49. In step S49, the CPU 12 checks whether a decoding error has occurred in the decoded servo sector number.

If NO in step S49, the CPU 12 checks whether the immediately preceding servo sector number indicated by PSN and the current servo sector number indicted by CSN are sequential, i.e., the current servo sector number is the number sequentially following the immediately preceding servo sector number (step S50)

If the current servo sector number is "0", which indicates a start servo sector, the immediately preceding servo sector number becomes a predetermined maximum value indicating a last servo sector. In this case, it is considered that the servo sector numbers are sequential.

If the immediately preceding servo sector number and the current servo sector number are not sequential, the CPU 12 determines that the currently decoded servo sector number (current servo sector number) is wrong, although no decoding error has occurred. An operation to be performed when an error is detected in the current servo sector number in step S50 or S49 will be described later.

If the immediately preceding servo sector number and the current servo sector number are sequential, the CPU 12 determines that no error is present in the currently decoded servo sector number (current servo sector number), and clears the error counter EC to "0" (step S51). Thereafter, the CPU 12 sets the current servo sector number (indicated by CSN), as an immediately preceding servo sector number, in the variable PSN (step S52). The CPU 12 then performs setup of the sector pulse generator 17 and execute processing of generating the data sector pulse DSP (step S53) in accordance with the flow chart shown in FIG. 6.

An operation to be performed when an error is detected in the current servo sector number in step S49 or S50 will be described next.

In this case, the CPU 12 checks whether the value of the error counter EC is equal to or larger than the preset value n1 (step S54). If the immediately preceding servo sector number (i.e., the preceding servo sector number previously obtained) indicated by PSN is properly decoded, the error counter EC has been cleared to "0" in step S51. Therefore, NO (EC≦n1) is obtained in step S54.

If NO in step S54 (i.e., the value of the error counter EC is smaller than the preset value n1), the CPU 12 infers a correct servo sector number to be obtained this time on the basis of the previously obtained servo sector number, i.e., the immediately preceding servo sector number indicated by PSN, and sets the inferred number in the variable CSN (step S55). More specifically, a correct servo sector number is obtained by adding +1 to the immediately preceding servo sector number indicated by PSN. If, however, the immediately preceding servo sector number is equal to the predetermined maximum value, i.e., the immediately preceding servo sector number indicates a last servo sector, "0" indicating a start servo sector is given as a correct servo sector number.

Upon executing step S55, the CPU 12 increments the contents of the error counter EC by one (step S56). At this time, the value of the error counter EC indicates the number of times that a servo sector number is consecutively inferred, after the error counter EC is cleared to "0" in step S51.

Upon executing step S56, the CPU 12 sets the current servo sector number (indicated by CSN), i.e., the servo sector number inferred in step S55, as the immediately preceding servo sector number, in the variable PSN (step S52). The CPU 12 then performs setup processing of the sector pulse generator 17 to generate the data sector pulse DSP on the basis of the current servo sector number (indicated by CSN) (step S53).

As described above, even if a decoding error is caused in a servo sector number extracted by the servo circuit 18 or a correct servo sector number cannot be obtained, a correct servo sector number to be currently obtained can be inferred on the basis of the previously obtained correct servo sector number held as the immediately preceding servo sector number PSN. Therefore, setup processing of the sector pulse generator 17 can be properly performed on the basis of this inferred servo sector number, and the data sector pulse DSP having no error can be generated with reference to the timing of the next servo sector pulse SSP, thereby properly executing a data recording/reproducing operation, as in the case wherein an extracted servo sector number has no error.

Note, however, that repetition of inference processing in step S55, i.e., consecutive repetition of inference of a servo sector number, indicates an abnormal state. That is, a true number and an inference result may not coincide with each other after repetition of inference processing. In this embodiment, therefore, if an error in a servo sector number is detected in step S49 or S50, it is checked whether the value of the error counter EC is equal to or larger than n1 (step S54). If the value of the error counter EC has reached n1, i.e., inference of a servo sector number is consecutively performed n1 times, inference of a servo sector number is not performed any more, and generation of a data sector pulse by the sector pulse generator 17 is stopped, thereby preventing generation of the data sector pulse DSP at a wrong timing when a true number and an inference result do not coincide with each other upon consecutive inference of a servo sector number.

Upon determining in step S54 that the value of the error counter EC is equal to or larger than n1, the CPU 12 sets the preset value n2 (n1<n2 ≦n3) in the error counter EC (step S57) to stop processing associated with the generation of a data sector pulse (step S43).

When n2 is set in the error counter EC, then EC>n1. That is, YES is obtained in step S45 when the next servo sector number is extracted by the servo processor 11. The flow then advances to step S46. If no error is present in the servo sector number, the contents of the error counter EC are decremented by one (step S47). Subsequently, the current correct servo sector number indicated by CSN is set in PSN (step S48), and processing associated with the generation of a data sector pulse is not performed at all (step S43).

As described above, if no decoding error is consecutively caused in a servo sector number (n2−n1) times after it is detected in step S54 that inference of a servo sector number is consecutively performed n1 times, the value of the error counter EC becomes n2−(n2−n1)=n1. With this operation, if a servo sector number is decoded next, NO is obtained in step S45 (EC≦n1), the flow advances to step S49, and processing required for the generation of a data sector pulse is performed.

In other words, after inference of a servo sector number is consecutively performed n1 times, the flow does not advance from step S45 to step S49 and processing associated with the generation of a data sector pulse is not performed at all until a correct servo sector number is consecutively decoded (n2−n1) times.

If a decoding error occurs in a servo sector number during the processing, the preset value n3 is set in the error counter EC (step S42). Similar to the case after the end of a seek operation, processing associated with the generation of a data sector pulse is not performed at all until a correct servo sector number is consecutively decoded (n3−n1) times.

With the above restrictions, the immediately preceding servo sector number indicated by PSN is guaranteed when the flow advances to the processing associated with the generation of a data sector pulse.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk storage apparatus comprising:

a head for reproducing information;

a disk having a plurality of tracks concentrically formed in a radial direction, each track having a plurality of servo sectors and a plurality of data areas which are alternately arranged, each of said servo sectors having servo data and servo sector information which are recorded therein, the servo data being used to position said head to said each track, and the servo sector information being given with continuity from a predetermined reference servo sector to identify said each servo sector, each of said plurality of data areas being divided into a plurality of data sectors;

extracting means for extracting servo sector information of said each servo sector;

determining means for determining a start position of a data sector of at least one data area corresponding to said servo sector identified by the servo sector information on the basis of the servo sector information extracted by said extracting means;

detecting means for determining whether given servo sector information is correctly extracted every time the servo sector information is extracted from said extracting means, and detecting an extraction error of the given servo sector information;

estimating means for estimating correct servo sector information on the basis of preceding servo sector information detected previously when said detecting means detects the extraction error of the servo sector information, and using the estimated servo sector information in place of the given servo sector information detected by said detecting means so as to determine the start position of the data sector;

holding means for holding the servo sector information properly extracted by the extracting means when it is determined by the detecting means that the servo sector information is properly extracted, and holding the servo sector information estimated by the estimating means when the extraction error in the servo sector information is detected by the detecting means;

wherein the estimating means estimates proper servo sector information from the servo sector information held by the holding means; and inhibiting means for counting the number of times that no extraction error is consecutively detected by the detecting means upon completion of a seek operation, and inhibiting determination of the start position of the data sector by the determining means until the number of times reaches a predetermined value.

2. An apparatus according to claim 1, further comprising storage means for storing format information associated with a position of at least one data sector corresponding to each of the servo areas, and wherein the determining means determines the start position of each data sector corresponding to the servo area on a basis of the format information, in the storage means, which corresponds to the servo area identified by the servo sector information extracted by the extracting means.

3. An apparatus according to claim 1, wherein the inhibiting means inhibits determination of the start position of the data sector by the determining means during a seek operation.

4. A disk storage apparatus comprising:

a head for reproducing information;

a disk having a plurality of tracks concentrically formed in a radial direction, each track having a plurality of servo sectors and a plurality of data areas which are alternately arranged, each of said servo sectors having servo data and servo sector information which are recorded therein, the servo data being used to position said head to said each track, and the servo sector information being given with continuity from a predetermined reference servo sector to identify said each servo sector, each of said plurality of data areas being divided into a plurality of data sectors;

extracting means for extracting servo sector information of said each servo sector;

determining means for determining a start position of a data sector of at least one data area corresponding to said servo sector identified by the servo sector information the basis of the servo sector information extracted by said extracting mean;

detecting means for determining whether given servo sector information is correctly extracted every time the servo sector information is extracted from said extracting means, and detecting an extraction error of the given servo sector information; and estimating means for estimating correct servo sector information on the basis of preceding servo sector information detected previously when said detecting means detects the extraction error of the servo sector information, and using the estimated servo sector information in place of the given servo sector information detected by said detecting means so as to determine the start position of the data sector;

wherein a inhibiting means includes means for counting the number of times that the servo sector is consecutively estimated by the estimating means, and for inhibiting estimation by the estimating means when the number of times reaches a predetermined value.

5. A method for generating a data sector pulse in a disk storage system, comprising the steps of:

providing a disk having a plurality of tracks concentrically formed in a radial direction, each track having a plurality of servo sectors and a plurality of data areas which are alternately arranged, each of said servo sectors having servo data and servo sector information which are recorded therein, the servo data being used to position a head to said each track, the servo sector information being used to identify said each servo sector, and each of said plurality of data areas being divided into a plurality of data sectors;

determining whether given servo sector information is correctly extracted every time the servo sector information is extracted from said servo sector;

estimating correct servo sector information on the basis of preceding servo sector information obtained previously when an extraction error of the servo sector information is determined; and determining a start position of a data sector corresponding to said estimated servo sector on the basis of the correctly extracted servo sector information or when the extraction error of said servo sector corresponding to the given servo sector information is determine;

holding the properly extracted servo sector information as the preceding servo sector information when it is determined that the servo sector information is properly extracted;

holding estimated servo sector information as the preceding servo sector information to use the information for estimation when the servo sector information is not properly extracted from the servo area next;

counting a number of times that no extraction error is consecutively detected by the detecting means upon completion of a seek operation; and inhibiting the step of determining the start position of the data sector until the number of times reaches a predetermined value.

6. A method for generating a data sector pulse in a disk storage system, comprising the steps of:

providing a disk having a plurality of tracks concentrically formed in a radial direction, each track having a plurality of servo sectors and a plurality of data areas which are alternately arranged, each of said servo sectors having servo data and servo sector information which are recorded therein, the servo data being used to position a head to said each track, the servo sector information being used to identify said each servo sector, and each of said plurality of data areas being divided into a plurality of data sectors;

determining whether given servo sector information is correctly extracted every time the servo sector information is extracted from said servo sector;

estimating correct servo sector information on the basis of preceding servo sector information obtained previously when an extraction error of the servo sector information is determined; and determining a start position of a data sector corresponding to said estimated servo sector on the basis of the correctly extracted servo sector information or when the extraction error of said servo sector corresponding to the given servo sector information is determined;

holding the correctly extracted servo sector information as the preceding servo sector information when it is determined that the servo sector information is correctly extracted;

holding estimated servo sector information as the preceding servo sector information to use the information for estimation when the servo sector information is not correctly extracted from the servo area next;

counting the number of times that the servo sector is consecutively estimated; and inhibiting the step of estimating the correct servo sector information when the number of times reaches a predetermined value.

* * * * *